US011557842B2

(12) United States Patent
Cho et al.

(10) Patent No.: US 11,557,842 B2
(45) Date of Patent: Jan. 17, 2023

(54) ANTENNA MODULE AND ELECTRONIC DEVICE USING THE SAME

(71) Applicant: SAMSUNG ELECTRONICS CO., LTD., Suwon-si (KR)

(72) Inventors: Namjun Cho, Suwon-si (KR); Hyosung Lee, Suwon-si (KR); Hyoseok Na, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 72 days.

(21) Appl. No.: 17/307,598

(22) Filed: May 4, 2021

(65) Prior Publication Data

US 2021/0344118 A1 Nov. 4, 2021

(30) Foreign Application Priority Data

May 4, 2020 (KR) ........................ 10-2020-0053360

(51) Int. Cl.
*H04B 1/40* (2015.01)
*H01Q 3/30* (2006.01)
*H01Q 1/22* (2006.01)
*H01Q 15/00* (2006.01)
*H01Q 3/36* (2006.01)

(52) U.S. Cl.
CPC ........... *H01Q 15/0033* (2013.01); *H01Q 3/36* (2013.01)

(58) Field of Classification Search
CPC .......... H01Q 1/22; H01Q 1/241; H01Q 1/242; H01Q 3/30; H01Q 3/36; H01Q 15/003; H04B 1/38; H04B 1/3827; H04B 1/40
See application file for complete search history.

(56) References Cited

U.S. PATENT DOCUMENTS

2012/0235881 A1* 9/2012 Pan ........................ H01Q 25/00 343/893
2015/0303575 A1 10/2015 Soler Castany et al.
2016/0359461 A1 12/2016 He et al.
(Continued)

FOREIGN PATENT DOCUMENTS

CN 109088181 * 11/2020 ............... H01Q 1/38
WO 2018/119153 6/2018
(Continued)

OTHER PUBLICATIONS

International Search Report and Written Opinion dated Aug. 18, 2021 in corresponding International Application No. PCT/KR2021/005623.

*Primary Examiner* — Blane J Jackson
(74) *Attorney, Agent, or Firm* — Nixon & Vanderhye, P.C.

(57) ABSTRACT

In an antenna module on one printed circuit board, a first area where a plurality of antenna elements are positioned on a first surface, and a second area where a plurality of front end integrated circuits are independently positioned on a second surface, the opposite surface of the first surface, are provided, and a wire is provided in the second area to electrically couple some ports of a plurality of ports provided in a first front end integrated circuit to some ports of a plurality of ports provided in a second front end integrated circuit. The some ports provided in the first front end integrated circuit include a first port configured to output a first intermediate frequency signal, and a second port configured to input a second intermediate frequency signal.

20 Claims, 27 Drawing Sheets

(56) References Cited

U.S. PATENT DOCUMENTS

| | | | | |
|---|---|---|---|---|
| 2019/0103682 | A1* | 4/2019 | Thai | H01Q 21/064 |
| 2019/0157772 | A1 | 5/2019 | Timmins et al. | |
| 2019/0348746 | A1 | 11/2019 | Gupta et al. | |
| 2021/0075088 | A1* | 3/2021 | Edwards | H01Q 21/24 |
| 2021/0320414 | A1 | 10/2021 | Kim et al. | |

FOREIGN PATENT DOCUMENTS

| | | |
|---|---|---|
| WO | 2018/135853 | 7/2018 |
| WO | 2020/045963 | 3/2020 |

* cited by examiner

ANTENNA MODULE AND ELECTRONIC DEVICE USING THE SAME

CROSS-REFERENCE TO RELATED APPLICATION

This application is based on and claims priority under 35 U.S.C. § 119 to Korean Patent Application No. 10-2020-0053360, filed on May 4, 2020, in the Korean Intellectual Property Office, the disclosure of which is incorporated by reference herein in its entirety.

BACKGROUND

Field

The disclosure relates to an electronic device which supports high frequency communication based on an antenna module.

Description of Related Art

5$^{th}$ generation (5G) communication systems or pre-5G communication systems (hereinafter, referred to as '5G communication systems') have developed to meet the increasing demand for traffic since 4$^{th}$ generation (4G) communication systems were commercialized. The 5G communication system is called a beyond 4G network communication system or a post long term evolution (LTE) system.

The 5G communication system may utilize a high frequency (mmWave) band (for example, a band of 60 GHz or higher) to provide a higher data transmission rate. Technologies for beamforming, including massive multiple input multiple output (MIMO), full dimensional MIMO (FD-MIMO), array antenna, analog beam-forming, and large scale antenna may be applied to the 5G communication system.

A 5G communication system may provide wireless communication by a high frequency (mmWave) band (for example, 3 GHz to 100 GHz) signal having a short wavelength and strong directivity to achieve a higher transmission rate than a 4G communication system. The 5G communication system may apply a front end module to support the high frequency band. The front end module may have a structure in which a transceiver and an antenna are integrated into a single device.

The 5G communication system may have a high attenuation characteristic (for example, attenuation of about 20 to 30 dB) compared to a communication system (for example, a 4G communication system) using a relatively low frequency band (within 6 GHz). The 5G communication system may enhance the attenuation characteristic by transmitting/receiving phase-aligned signals, simultaneously, through a plurality of antenna elements arranged in an array pattern.

In the 5G communication system, a printed circuit board (PCB) of an antenna module may be designed based on a design rule which considers factors such as flexibility of a front end integrated circuit, constraints of installation space, generation of unnecessary elements. The design rule may refer to a design rule regarding a width of a wire, a gap between wires. The design rule may be established to minimize occurrence of a defect and an error in designing an electronic circuit and designing a wire pattern.

The PCB designed according to the design rule may have one front end integrated circuit disposed thereon. The design rule may require satisfaction of at least one of a vertical width (Y-Dim), a horizontal width (X-Dim), or an aspect ratio of the PCB and/or the front end integrated circuit.

Accordingly, an aspect ratio less than or equal to a threshold may be required to fix the vertical width of the PCB and to enhance the degree of integration of the front end integrated circuit. The aspect ratio less than or equal to the threshold may cause an IC to be broken or to be misaligned in a process of manufacturing the IC/module. If the IC is broken or misaligned, a yield may be reduced or a cost may increase.

In addition, when an antenna module is designed by one front end integrated circuit, the one front end integrated circuit may be designed to have a maximum number of antenna elements disposed therein. In this case, there may be unused and wasted elements in the front end integrated circuit.

The above information is presented as background information only to assist with an understanding of the disclosure. No determination has been made, and no assertion is made, as to whether any of the above might be applicable as prior art with regard to the disclosure.

SUMMARY

The disclosure may address the above-described problems and disadvantages and provide at least the advantages described below.

Embodiments of the disclosure provide an apparatus which has at least one wireless communication circuit including a port for connecting between wireless communication circuits and disposed on a PCB of an antenna module for high-frequency communication in an electronic device, and a method thereof.

According to an example embodiment of the disclosure, an electronic device includes: a housing; at least one antenna module comprising at least one antenna disposed inside the housing; and a wireless communication circuit electrically connected with the at least one antenna module, wherein the at least one antenna module includes: a printed circuit board including a first surface and a second surface, the second surface facing an opposite direction of the first surface; at least one antenna element disposed in the printed circuit board closer to the first surface than to the second surface; and a first front end integrated circuit disposed on the second surface and electrically connected with at least one of the at least one antenna element, wherein the first front end integrated circuit includes at least one port configured to electrically connect a second front end integrated circuit additionally disposed on the second surface, and the at least one port including a first port configured to output a first intermediate frequency signal to the second front end integrated circuit or to receive a second intermediate frequency signal from the second front end integrated circuit.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
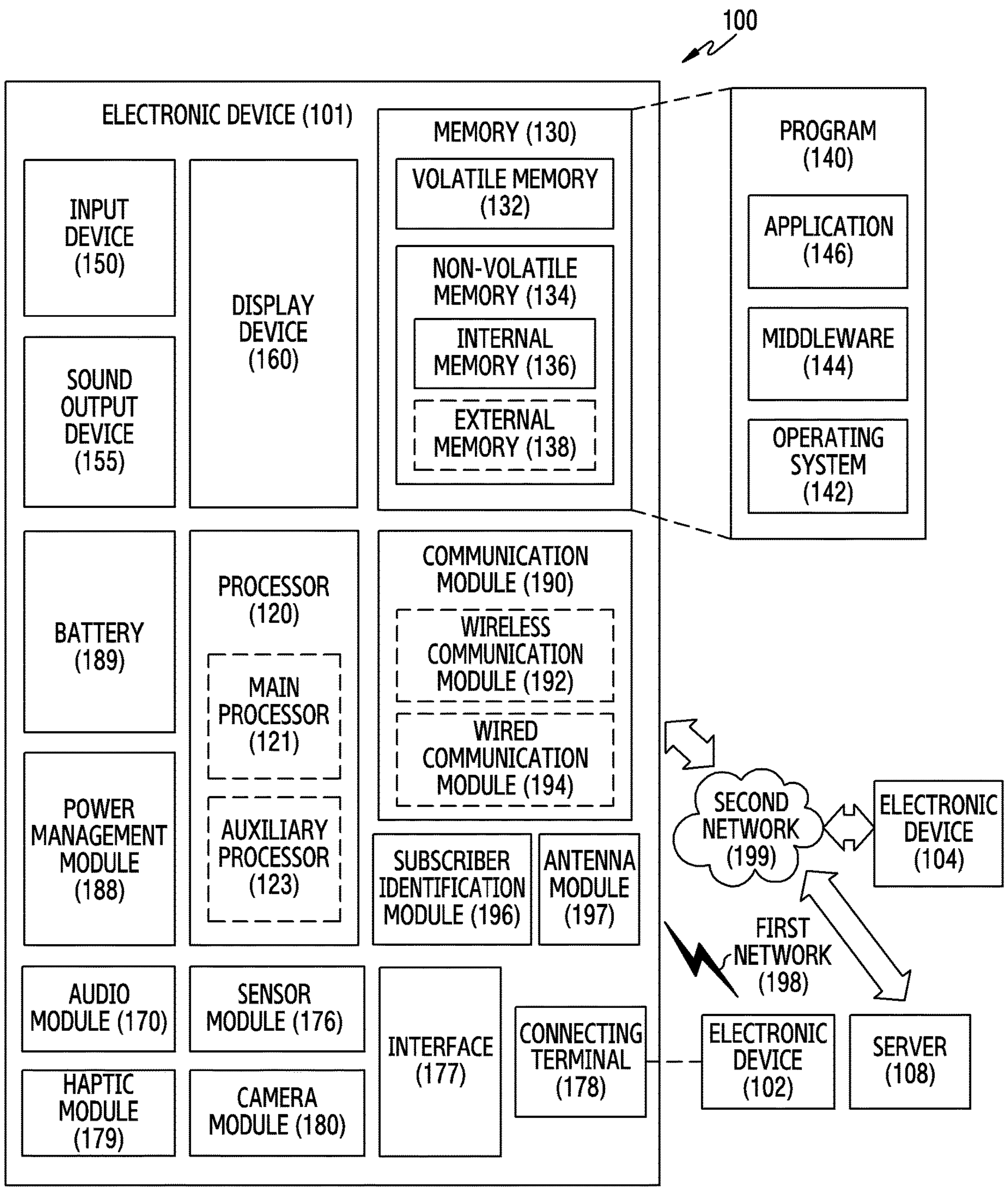
FIG. 1 is a diagram illustrating an example electronic device in a network environment according to various embodiments.

Hereinafter, various example embodiments will be described in greater detail with reference to the accompanying drawings. For convenience of explanation, sizes of components illustrated in the drawings may be exaggerated or miniaturized. For example, sizes and thickness of respective components illustrated in the drawings are arbitrarily illustrated for convenience of explanation, and it should be noted that various example embodiments suggested in the disclosure are not necessarily limited to the illustrated sizes and thicknesses. In addition, in the following description, specific details such as detailed configurations and components are merely provided for easy understanding of embodiments of the disclosure. Accordingly, it should be apparent to those skilled in the art that various changes and modifications can be made to the various example embodiments described in the disclosure without departing from the scope and idea of the disclosure. In addition, explanations of well-known functions and configurations may be omitted for the sake of clarity and brevity.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may include a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
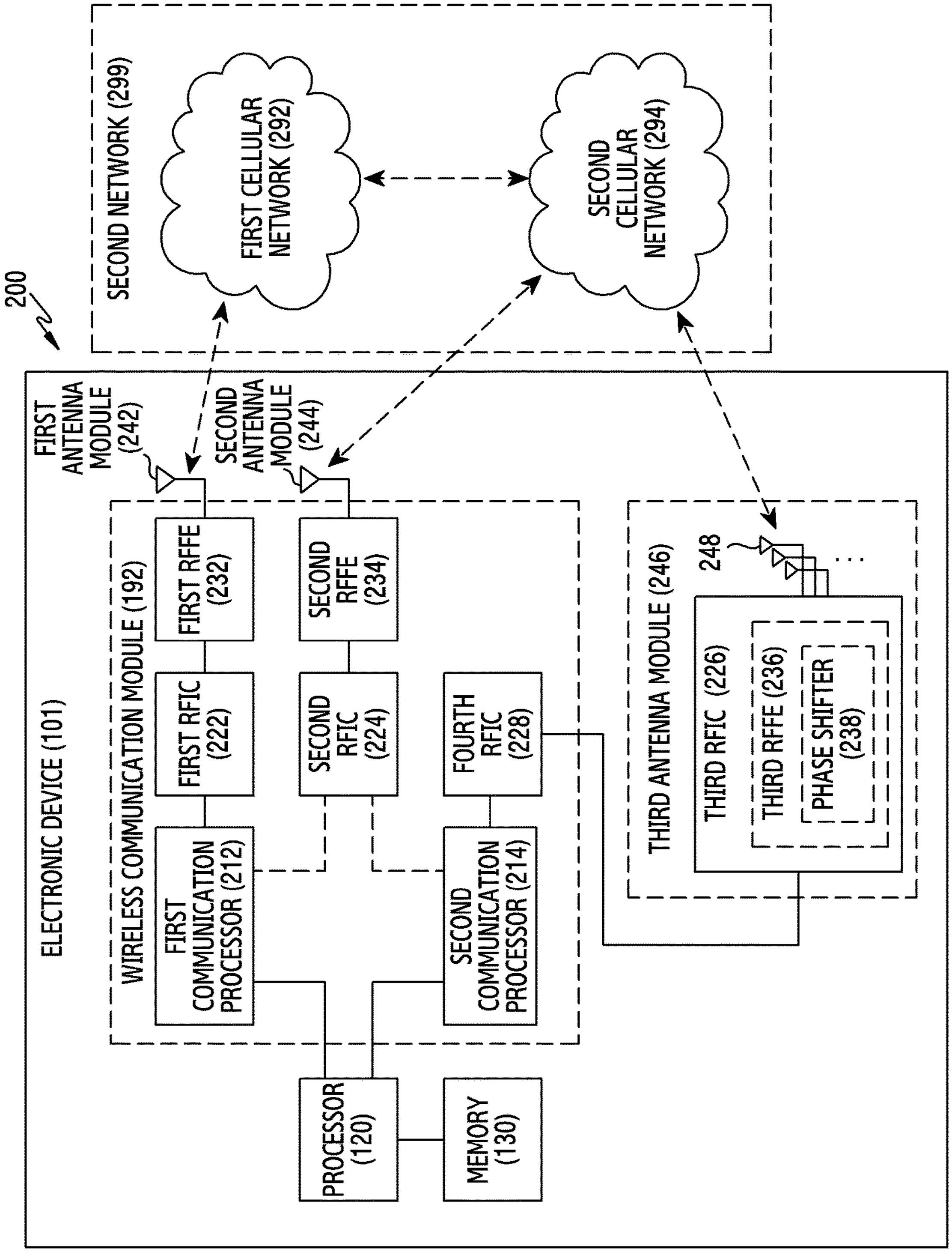
FIG. 2 is a diagram illustrating an example electronic device which supports multiple frequency bands according to various embodiments.

FIG. 2 is a diagram illustrating an example electronic device that supports multiple frequency bands according to various embodiments.

Referring to FIG. 2, the electronic device 101 includes a first communication processor (e.g., including processing circuitry) 212, a second communication processor (e.g., including processing circuitry) 214, a first RFIC 222, a second RFIC 224, a third RFIC 226, a fourth RFIC 228, a first RFFE 232, a second RFFE 234, a first antenna module 242, a second antenna module 244, and antennas 248. The electronic device 101 further includes a processor (e.g., including processing circuitry) 120 and a memory 130. A second network 299 includes a first cellular network 292 and a second cellular network 294. The electronic device 101 may further include at least one of the components illustrated in FIG. 1, and the second network 299 may further include at least another network. The first communication processor 212, the second communication processor 214, the first RFIC 222, the second RFIC 224, the fourth RFIC 228, the first RFFE 232, and the second RFFE 234 configure at least a part of the wireless communication module 192. The fourth RFIC 228 may be omitted or may be included as a part of the third RFIC 226.

The first communication processor 212 may include various processing circuitry and support establishment of a communication channel of a band to be used for wireless communication with the first cellular communication network 292, and legacy network communication via the established communication channel. The first cellular network 292 may be a legacy network including a second generation (2G), third generation (3G), fourth generation (4G), or long term evolution (LTE) network. The second communication processor 214 may include various processing circuitry and support establishment of a communication channel corresponding to a designated band (e.g., about 6 GHz to about 60 GHz) among bands to be used for wireless communication with the second cellular network 294, and 5G network communication via the established communication channel. The second cellular network 294 may be a fifth generation (5G) network defined by 3rd generation partnership project (3GPP). In addition, the first communication processor 212 or the second communication processor 214 may support establishment of a communication channel corresponding to another designated band (e.g., about 6 GHz or lower) among the bands to be used for wireless communication with the second cellular network 294, and 5G network communication via the established communication channel. The first communication processor 212 and the second communication processor 214 may be implemented in a single chip or a single package. Alternatively, the first communication processor 212 or the second communication processor 214 may be configured, in a single chip or a single package, together with the processor 120, an auxiliary processor 123, or the communication module 190. The first communication processor 212 and the second communication processor 214 may be directly or indirectly connected to each other by an interface, in order to provide or receive data or a control signal in either or both directions.

The first RFIC 222 may convert, during transmission, a baseband signal generated by the first communication processor 212 into an RF signal of about 700 MHz to about 3 GHz used for the first cellular network 292 (e.g., a legacy network). During reception, the RF signal may be acquired from the first cellular network 292 via the first antenna module 242 and may be preprocessed via the first RFFE 232. The first RFIC 222 may convert the preprocessed RF signal into a baseband signal to be processed by the first communication processor 212.

The second RFIC 224 may convert, during transmission, a baseband signal generated by the first communication processor 212 or the second communication processor 214 into an RF signal (e.g., a 5G Sub6 RF signal) of a Sub6 band (e.g., about 6 GHz or lower) used for the second cellular network 294 (e.g., 5G network). During reception, the 5G Sub6 RF signal may be acquired from the second cellular network 294 via the second antenna module 244 and may be preprocessed via the second RFFE 234. The second RFIC 224 may convert the preprocessed 5G Sub6 RF signal into a baseband signal to be processed by the first communication processor 212 or the second communication processor 214.

The third RFIC 226 may convert a baseband signal generated by the second communication processor 214 into an RF signal (e.g., a 5G Above6 RF signal) of a 5G Above6 band (e.g., about 6 GHz to about 60 GHz) to be used for the second cellular network 294. During reception, the 5G Above6 RF signal may be acquired from the second cellular network 294 via the antenna 248 and may be preprocessed via the third RFFE 236. The third RFIC 226 may convert the preprocessed 5G Above6 RF signal into a baseband signal to be processed by the second communication processor 214. The third RFFE 236 may be configured as a part of the third RFIC 226.

The electronic device 101 may include the fourth RFIC 228 separately from or as at least a part of the third RFIC 226. In this case, the fourth RFIC 228 may convert a baseband signal generated by the second communication processor 214 into an RF signal (e.g., an intermediate frequency (IF) signal) of an IF band (e.g., about 9 GHz to about 11 GHz), and then may transfer the IF signal to the third RFIC 226. The third RFIC 226 may convert the IF signal into a 5G Above6 RF signal. During reception, the 5G Above6 RF signal may be received from the second cellular network 294 via the antenna 248 and may be converted to an IF signal by the third RFIC 226. The fourth RFIC 228 may convert the IF signal into a baseband signal to be processed by the second communication processor 214.

The first RFIC 222 and the second RFIC 224 may be implemented as a single chip or at least part of a single package. The first RFFE 232 and the second RFFE 234 may be implemented as a single chip or at least part of a single package. Alternatively, at least one of the first antenna module 242 or the second antenna module 244 may be omitted, or may be combined with another antenna module in order to process RF signals in a plurality of corresponding bands.

The third RFIC 226 and the antenna 248 may be disposed on the same substrate in order to configure a third antenna module 246. For example, the wireless communication module 192 or the processor 120 may be disposed on a first substrate (e.g., a main PCB). In this case, the third RFIC 226 may be disposed in a partial area (e.g., a bottom surface) of a second substrate (e.g., a sub-PCB) separate from the first substrate, and the antenna 248 may be disposed in another area partial area (e.g., a top surface), thereby configuring the third antenna module 246. By placing the third RFIC 226 and the antenna 248 on the same substrate, it is possible to reduce the length of a transmission line therebetween. This configuration may reduce the loss (e.g., attenuation) of a signal, which is caused due to a transmission line, in a high frequency band (e.g., about 6 GHz to about 60 GHz) used for 5G network communication. Accordingly, the electronic device 101 may improve the quality or speed of communication with the second cellular network 294.

The antennas 248 may be configured by an antenna array including a plurality of antenna elements for beamforming. In this case, the third RFIC 226 may include a plurality of phase shifters 238 corresponding to the plurality of antenna elements, as a part of the third RFFE 236. During transmission, each of the plurality of phase shifters 238 may convert the phase of a 5G Above6 RF signal to be transmitted to the outside (e.g., base station of the 5G network) of the electronic device 101 via a corresponding antenna element. During reception, each of the plurality of phase shifters 238 may convert the phase of the 5G Above6 RF signal received from the outside via the corresponding antenna element, into the same or substantially the same phase. Accordingly, transmission or reception may be performed via beamforming between the electronic device 101 and the outside.

Each of or at least one of the first to third RFFEs 232, 234, and 236 may include a protection device and/or a method for preventing and/or reducing an internal power amplifier from burning out due to frequency unlocking of a local oscillation signal generated by a local oscillator for supplying overcurrent or frequency mixing. The protection device may recognize that the frequency of the local oscillation signal is unlocked by sensing that the frequency of the local oscillation signal is out of a frequency band designated for transmission of a transmission signal.

Although FIG. 2 illustrates an example in which the electronic device 101 includes three RFFs 232, 234, and 236, the protection device and/or the method therefore according to various proposed embodiments may be applied regardless of the number of RFFEs included in the electronic device 101.

The second cellular network 294 may be operated independently of (e.g., stand-alone (SA) or in connection with (e.g., non-stand-alone (NSA)) the first cellular network 292. For example, the 5G network may have only an access network (e.g., 5G radio access network (RAN) or next generation RAN (NG RAN)) and may not have a core network (e.g., next generation core (NGC)). In this case, the electronic device 101 may access the access network of the 5G network, and then may access an external network (e.g., Internet) under the control of a core network (e.g., evolved packet core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by other components (e.g., the processor 120, the first communication processor 212, or the second communication processor 214).

The processor 120 of the electronic device 101 may include various processing circuitry and execute one or more instructions stored in the memory 130. The processor 120 may include a circuit for data processing, for example, at least one of an IC, an arithmetic logic unit (ALU), a field programmable gate array (FPGA), and large scale integration (LSI). The memory 130 may store data related to the electronic device 101. The memory 130 may include a volatile memory, such as a random access memory (RAM) including a static random access memory (SRAM), a dynamic RAM (DRAM), etc., or may include a non-volatile memory, such as a flash memory, an embedded multimedia card (eMMC), a solid state drive (SSD), etc., as well as a read only memory (ROM), a magneto-resistive RAM (MRAM), a spin-transfer torque MRAM (STT-MRAM), a phase-change RAM (PRAM), a resistive RAM (RRAM), and a ferroelectric RAM (FeRAM).

The memory 130 may store instructions related to an application and instructions related to an OS. The OS is system software executed by the processor 120. The processor 120 may manage hardware components included in the electronic device 101 by executing the operating system. The operating system may provide an application programming interface (API) to applications that are software other than the system software.

One or more applications, which are a set of multiple instructions, may be installed in the memory 130. Installation of an application in the memory 130 may indicate that the application is stored in a format executable by the processor 120 connected to the memory 130.

Figure 3:
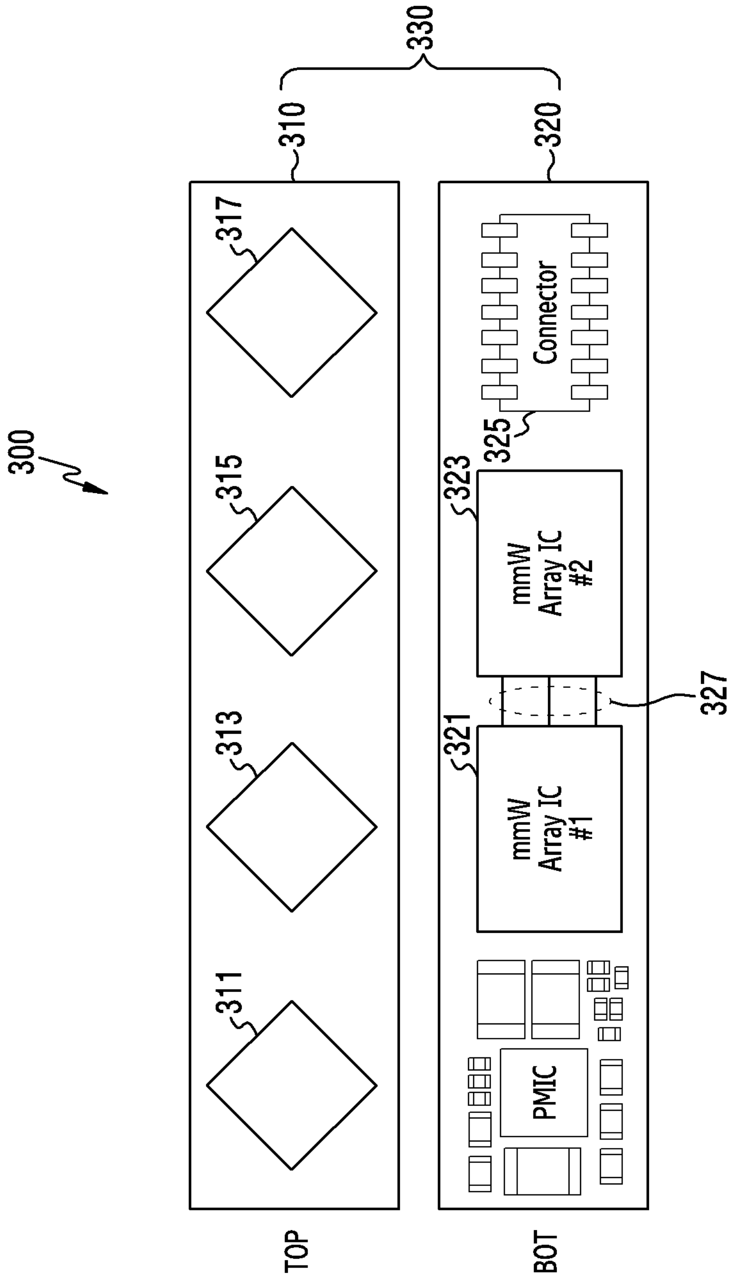
FIG. 3 is a diagram illustrating an example PCB structure corresponding to an antenna module in an electronic device according to various embodiments.

FIG. 3 is a diagram illustrating an example PCB structure which is included in an antenna module 300 (for example, the third antenna module 246 of FIG. 2) included in an electronic device (for example, the electronic device 101 of FIG. 1). In the following descriptions, the PCB included in the antenna module 300 will be generalized and referred to as a 'PCB 330' for convenience of explanation.

Referring to FIG. 3, the electronic device 101 according to an embodiment may include a housing (not shown). The housing may include, for example, at least one antenna module (for example, the first, second, or third antenna module 242, 244, 246 of FIG. 2) and a wireless communication circuit (for example, the wireless communication module 192 of FIG. 2) electrically connected with the at least one antenna module.

The at least one antenna module according to an embodiment may include the PCB 330. The PCB 330 may include two surfaces 310, 320. The PCB 330 may include, for example, a first surface 310 and a second surface 320 which face in the opposite directions. The first surface 310 and the second surface 320 may face in opposite directions, for example. The PCB 330 may include at least one antenna element and at least one front end integrated circuit. The at least one antenna element may be disposed in the PCB 330 closer to the first surface 310 than to the second surface 320. The at least one front end integrated circuit may be disposed in the PCB 330 closer to the second surface 320 than to the first surface 310.

According to an embodiment, an antenna array may be disposed on the first surface (for example, a top surface) 310 out of the two surfaces of the PCB 330. For example, the PCB 330 may include a plurality of layers (not shown) between the first surface 310 and the second surface 320. The plurality of layers may include, for example, at least one conductive layer or at least one insulation layer. For example, the first surface 310 may have the antenna array including antenna elements 311, 313, 315, 317 and disposed thereon. In this case, the insulation layer may be positioned over the first surface 310 and the antenna elements 311, 313, 315, 317. In an example, the antenna elements 311, 313, 315, 317 may be disposed in the PCB closer to the first surface 310 than to the second surface 320. For example, the antenna elements 311, 313, 315, 317 may be disposed on a layer that is relatively closer to the first surface 310 than to the second surface 320 from among the plurality of layers included in the PCB 330 between the first surface 310 and the second surface 320 of the PCB 330. On the second surface (for example, a bottom surface (BOT)) 320, which is the other one of the two surfaces of the PCB 330, various elements such as at least one of a plurality of high-frequency front end integrated circuits (for example, an mmW array IC, hereinafter, referred to as a 'front end integrated circuit') 321, 323, a connector 325, and/or a PMIC (for example, the power management module 188 of FIG. 1) may be disposed. For example, the connector 325 may physically or electrically connect the front end integrated circuit 321, 323 to another PCB (for example, a main PCB). For example, the front end integrated circuit 321, 323 may be a circuit in which an RFIC and an RFFE are combined. According to an embodiment, at least one of the first front end integrated circuit (mmW Array IC #1) 321 and the second front end integrated circuit (mmW Array IC #2) 323 may be omitted.

According to an embodiment, the front end integrated circuit 321 or 323 may be produced by a complementary metal-oxide semiconductor (CMOS) process. For example, the CMOS process may be a semiconductor process which is widely used for manufacturing a phased-array IC. The CMOS process is used to integrate components, such as a plurality of power amplifiers (PAs), a plurality of low noise amplifiers (LNAs), or a plurality of phase shifters, into a space which is restricted in view of a cost/a degree of integration, and thus a micro (for example, 30 nm or less) CMOS process may be suitable.

According to an embodiment, the first surface 310 of the PCB 330 may include a first area where the plurality of antenna elements 311, 313, 315, 317 are positioned, and the second surface 320 which is the opposite surface of the first surface 310 may include a second area where the first front end integrated circuit (mmW Array IC #1) 321 and the second front end integrated circuit (mmW Array IC #2) 323 are positioned. For example, the second area of the second surface 320 may have the plurality of front end integrated circuits 321, 323 disposed therein. For convenience of explanation, a structure having two front end integrated circuits including four chains (4-Chain Array IC) mounted therein is assumed in the drawing. However, the number of chains included in one front end integrated circuit may vary or the number of frequency bands to be supported may vary when necessary.

According to an embodiment, a wire 327 may be included to electrically couple some ports of a plurality of ports included in the first front end integrated circuit 321 to some ports of a plurality of ports included in the second front end integrated circuit 323 when the first front end integrated circuit 321 and the second front end integrated circuit 323 are positioned in the second area existing on the second surface 320 of the PCB 330.

According to an embodiment, the plurality of ports provided in the first front end integrated circuit 321 may include a first port or a plurality of antenna ports. The first port may be configured to input a first signal in which an intermediate frequency signal and a reference clock are coupled from an internal circuit (for example, an intermediate frequency integrated circuit (IFIC)). The plurality of antenna ports may be configured to forward or receive radio frequency signals to or from the plurality of antenna elements 311, 313, 315, 317 positioned on the first surface 310 of the PCB 330. The plurality of antenna ports may be configured to electrically connect the plurality of antenna elements 311, 313, 315, 317.

According to an embodiment, via holes (not shown) may be formed to penetrate through at least a portion of the PCB 330 to electrically connect the plurality of antenna ports provided in the first front end integrated circuit 321 to the plurality of antenna elements 311, 313, 315, 317 which are disposed or will be disposed on the first surface 310 of the PCB 330.

According to an embodiment, the first front end integrated circuit 321 may include a second port or a third port. For example, the second port may be configured to output an intermediate frequency signal (hereinafter, referred to as a 'first intermediate frequency signal') which is processed in the first front end integrated circuit 321. The first intermediate frequency signal may be divided into, for example, a first transmission intermediate frequency signal or a first reception intermediate frequency signal. For example, the third port may be configured to receive an intermediate frequency signal (hereinafter, referred to as a 'second intermediate frequency signal') which is processed in the outside (for example, another front end integrated circuit). The second intermediate frequency signal may be divided into, for example, a second transmission intermediate frequency signal or a second reception intermediate frequency signal. The first intermediate frequency signal output from the second port may be input to the third port provided in the second front end integrated circuit 323 through the wire 327. The second intermediate frequency signal input to the third port provided in the first front end integrated circuit 321 may be output from the second port provided in the second front end integrated circuit 323, and may be forwarded through the wire 327.

According to an embodiment, the first front end integrated circuit 321 may further include a fourth port or a fifth port. The fourth port may be configured to output a reference clock (hereinafter, referred to as a 'first reference clock') which is processed in the first front end integrated circuit 321. The fifth port may be configured to receive a reference clock (hereinafter, referred to as a 'second reference clock') which is processed in the outside (for example, another front end integrated circuit). The first reference clock output from the fourth port may be input to the fifth port provided in the second front end integrated circuit 323 through the wire 327. The second reference clock input to the fifth port provided in the first front end integrated circuit 321 may be output from the fourth port provided in the second front end integrated circuit 323, and may be forwarded through the wire 327.

According to an embodiment, the first front end integrated circuit 321 may further include a sixth port or a seventh port. The sixth port may be configured to output a local oscillation frequency signal (hereinafter, referred to as a 'first local oscillation frequency signal') which is processed in the first front end integrated circuit 321. The seventh port may be configured to receive a local oscillation frequency signal (hereinafter, referred to as a 'second local oscillation frequency signal') which is processed in the outside (for example, another front end integrated circuit). The first local oscillation frequency signal output from the sixth port may be input to the seventh port provided in the second front end integrated circuit 323 through the wire 327. The second local oscillation frequency signal input to the seventh port provided in the first front end integrated circuit 321 may be output from the sixth port provided in the second front end integrated circuit 323, and may be forwarded through the wire 327.

Figure 4:
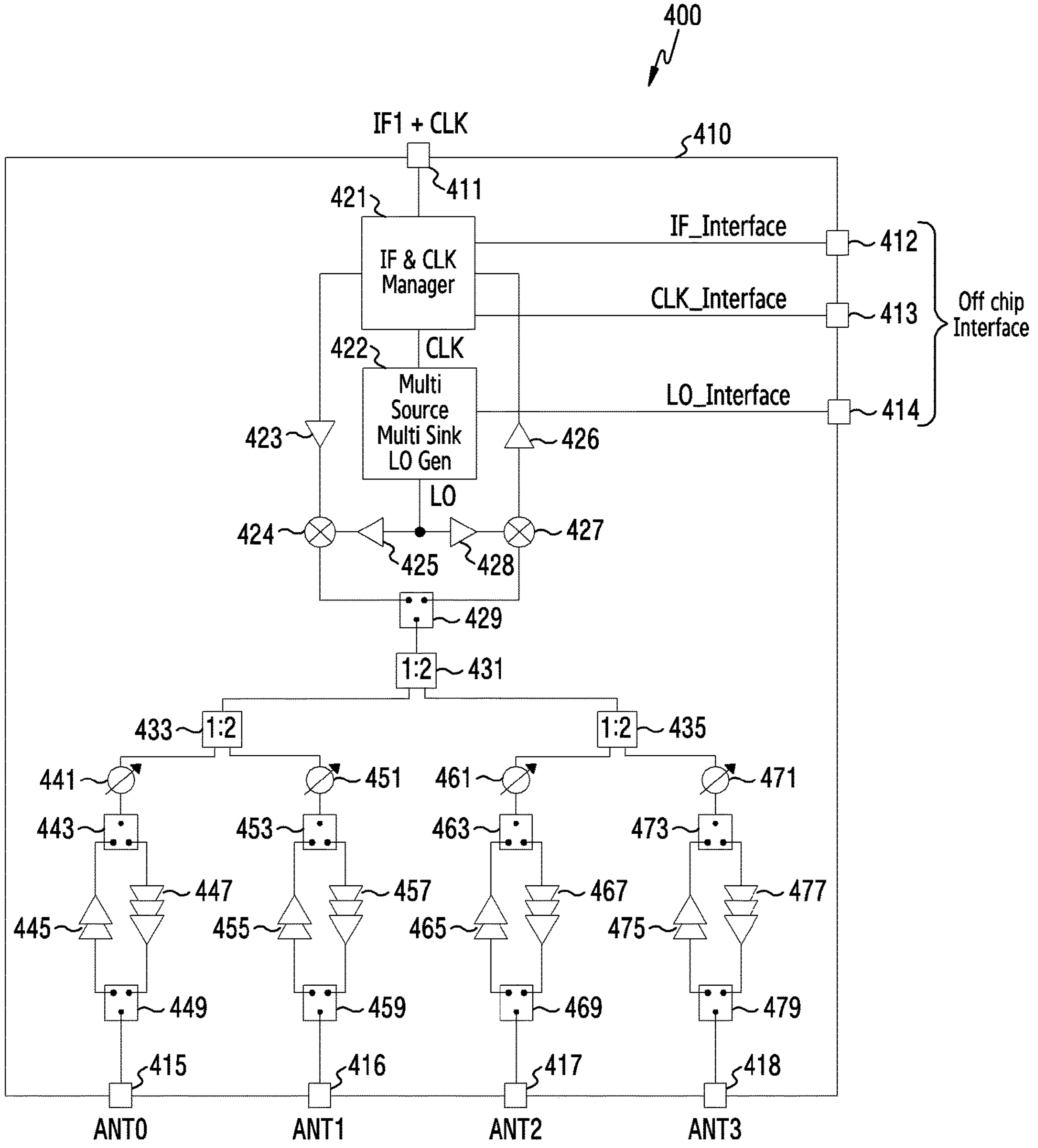
FIG. 4 is a diagram illustrating an example of a front end integrated circuit including an antenna module in an electronic device according to various embodiments.

FIG. 4 is a diagram 400 illustrating an example of a front end integrated circuit (for example, the first front end integrated circuit 321 or the second front end integrated circuit 323 of FIG. 3) 410 including an antenna module (for example, the third antenna module 246 of FIG. 2) in an electronic device (for example, the electronic device 101 of FIG. 1) according to various embodiments.

Referring to FIG. 4, the front end integrated circuit 410 according to an embodiment may include a plurality of ports. The plurality of ports may include, for example, first to eighth ports 411, 412, 413, 414, 415, 416, 417, 418. The second port 412 to the fourth ports 414 may correspond to off chip interfaces which exchange signals such as a transmission/reception intermediate frequency signal (IF), a reference clock (CLK), a local oscillation frequency signal (LO) with another front end integrated circuit (for example, the second front end integrated circuit 323 of FIG. 3).

According to an embodiment, the first port 411 may receive a first signal (IF1+CLK) in which a transmission intermediate signal and a reference clock are coupled from an internal circuit (for example, the fourth RFIC 228 of FIG. 2), or may output a second signal including a reception intermediate frequency signal to the internal circuit (for example, the fourth RFIC 228 of FIG. 2).

According to an embodiment, the second port 412 may exchange an intermediate frequency signal with another front end integrated circuit (for example, the second front end integrated circuit 323 of FIG. 3). The second port 412 may output a first intermediate frequency signal which will be processed by the front end integrated circuit 410 (for example, the first front end integrated circuit 321 of FIG. 3), or may receive a second intermediate frequency signal which is output from the second port provided in another front end integrated circuit (for example, the second front end integrated circuit 323 of FIG. 3). The first intermediate frequency signal output from the second port 412 may be input to the second port provided in another front end integrated circuit (for example, the second front end integrated circuit 323 of FIG. 3). The first intermediate frequency signal may be a first transmission intermediate frequency signal that the front end integrated circuit 410 receives from an IFIC (for example, the fourth RFIC 228 of FIG. 2) to transmit, and/or a first reception intermediate frequency signal that is down frequency converted from a reception radio frequency signal. The second intermediate frequency signal may be a second transmission intermediate frequency signal and/or a second reception intermediate frequency signal that another front end integrated circuit (for example, the second front end integrated circuit 323 of FIG. 3) receives from an IFIC to transmit, or that is down frequency converted from a reception radio frequency signal and is forwarded through the second port 412.

According to an embodiment, the third port 413 may exchange a reference clock with another front end integrated circuit (for example, the second front end integrated circuit 323 of FIG. 3). The third port 413 may output a first reference clock of the front end integrated circuit 410, or may receive a second reference clock output from the third port provided in another front end integrated circuit (for example, the second front end integrated circuit 323 of FIG. 3). The first reference clock output from the third port 413 may be input to the third port provided in another front end integrated circuit (for example, the second front end integrated circuit 323 of FIG. 3). For example, the first reference clock may be a reference clock that the front end integrated circuit 410 receives from the IFIC to transmit and/or receive. For example, the second reference clock may be a reference clock that another front end integrated circuit (for example, the second front end integrated circuit 323 of FIG. 3) receives from the IFIC to transmit and/or receive.

According to an embodiment, the fourth port 414 may exchange a local oscillation frequency signal with another front end integrated circuit (for example, the second front end integrated circuit 323 of FIG. 3). The fourth port 414 may output a first local oscillation frequency signal of the front end integrated circuit 410, or may receive a second local oscillation frequency signal output from the fourth port provided in another front end integrated circuit (for example, the second front end integrated circuit 323 of FIG. 3). The first local oscillation frequency signal output from the fourth port 414 may be input to the fourth port provided in another front end integrated circuit (for example, the second front end integrated circuit 323 of FIG. 3). For example, the first local oscillation frequency signal may be a local oscillation frequency signal that is generated by the front end integrated circuit 410 using a first and/or second reference signal. For example, the second local oscillation frequency signal may be a local oscillation frequency signal that is generated by another front end integrated circuit (for example, the second front end integrated circuit 323 of FIG. 3) using the first and/or second reference signal.

According to an embodiment, the plurality of antenna ports 415, 416, 417, 418 may be configured to forward or receive radio frequency signals to or from a plurality of antenna elements (for example, the plurality of antenna elements 311, 313, 315, 317 of FIG. 3) ANT0, ANT1, ANT2, ANT3. The plurality of antenna ports 415, 416, 417, 418 may be configured to be electrically connected with the plurality of antenna elements.

According to an embodiment, during a transmission operation, the front end integrated circuit 410 may separate the first transmission intermediate frequency signal and the first reference clock from the first signal input to the first port 411. The front end integrated circuit 410 may output the first transmission intermediate frequency signal to the second port 412 or may receive the second transmission intermediate frequency signal from the second port 412. The front end integrated circuit 410 may output the first reference clock to the third port 413 or may receive the second reference clock from the third port 413. The front end integrated circuit 410 may generate a local oscillation frequency signal LO using one of the first reference clock or the second reference clock. The front end integrated circuit 410 may output the generated first local oscillation frequency signal LO to the fourth port 414. The front end integrated circuit 410 may receive the second local oscillation frequency signal generated by another front end integrated circuit through the fourth port 414. The front end integrated circuit 410 may up-convert one of the first transmission intermediate frequency signal or the second transmission intermediate frequency signal into a radio frequency signal using one of the first local oscillation frequency signal or the second local oscillation frequency signal. The front end integrated circuit 410 may amplify power for the up-converted radio frequency signal and then may output the signal through at least one antenna port of the plurality of antenna ports 415, 416, 417, 418.

According to an embodiment, during a reception operation, the front end integrated circuit 410 may receive a radio frequency signal through at least one antenna port from among the plurality of antenna ports 415, 416, 417, 418. The front end integrated circuit 410 may perform low noise amplification with respect to the received radio frequency signal, and then, may down-convert the radio frequency signal into a first reception intermediate frequency signal using one of the first local oscillation frequency signal or the second local oscillation frequency signal. The front end integrated circuit 410 may output the down-converted first reception intermediate frequency signal to the second port 412 or the first port 411.

According to an embodiment, the front end integrated circuit 410 may include a signal manager (which may be used interchangeably with the term IF & CLK manager) 421, a local oscillation frequency generator (multi-source, multi-sink LO generator) 422, a plurality of amplifiers 423, 426, 425, 428, a first mixer 424, a second mixer 427, a plurality of switches 429, 443, 449, 453, 459, 463, 469, 473, 479, a plurality of phase shifters 441, 451, 461, 471, a plurality of splitter-combiners 431, 433, 435, a plurality of power amplifiers 447, 457, 467, 477, or a plurality of low noise amplifiers 445, 455, 465, 475.

According to an embodiment, the signal manager 421 may receive or provide an IF signal and/or a clock (CLK) signal from or to a wireless communication circuit (for example, an IFIC) through the first port 411. In an example, the signal manager 421 may provide or receive an IF signal (for example, the first transmission/reception intermediate frequency signal or the second transmission/reception intermediate frequency signal) to or from another front end integrated circuit through the second port 412. In an example, the signal manager 421 may provide or receive a reference clock (for example, the first reference clock or the second reference clock) to or from another front end integrated circuit through the third port 413.

According to an embodiment, the signal manager 421 may receive the first transmission intermediate frequency signal from the wireless communication circuit (for example, the IFIC) through the first port 411, and may forward the first transmission intermediate frequency signal to another front end integrated circuit through the second port 412. In an example, the signal manager 421 may receive the first transmission intermediate frequency signal from the wireless communication circuit (for example, the IFIC) through the first port 411, and may forward the first transmission intermediate frequency signal to an internal circuit of the front end integrated circuit 410. In an example, the signal manager 421 may receive the first transmission intermediate frequency signal from the wireless communication circuit (for example, the IFIC) through the first port 411, and may forward the first transmission intermediate frequency signal to the first mixer 242 through the first amplifiers 423 included in another front end integrated circuit and the front end integrated circuit 410, simultaneously. In an example, the signal manager 421 may receive the second reception intermediate frequency signal from another front end integrated circuit through the second port 412, and may forward the second reception intermediate frequency signal to the wireless communication circuit (for example, the IFIC) through the first port 411. In further example, the signal manager 421 may receive the second transmission intermediate frequency signal from another front end integrated circuit through the second port 412, and may forward the second transmission intermediate frequency signal to the first mixer 242 through the first amplifier 423 included in the front end integrated circuit 410. In still further example, the signal manager 421 may receive the first reception intermediate frequency signal output by the second mixer 427 included in the front end integrated circuit 410 through the fourth amplifier 426, and may forward the first reception intermediate frequency signal to the wireless communication circuit (for example, the IFIC) through the first port 411. In yet further example, the signal manager 421 may receive the first reception intermediate frequency signal output by the second mixer 427 included in the front end integrated circuit 410 through the fourth amplifier 426, and may forward the first reception intermediate frequency signal to another front end integrated circuit through the second port 412.

According to an embodiment, the signal manager 421 may receive the first reference clock from the wireless communication circuit (for example, the IFIC) through the first port 411, and may forward the first reference clock to another front end integrated circuit through the third port 413. In an example, the signal manager 421 may receive the second reference clock from the wireless communication circuit (for example, the IFIC) through the first port 411, and may forward the second reference clock to a digital circuit and/or a phase-locked loop (PLL) included in the front end integrated circuit 410. In an example, the signal manager 421 may receive the first reference clock from the wireless communication circuit (for example, the IFIC) through the first port 411, and may forward the first reference clock to the digital circuits and/or the phase-locked loops (PLL) included in another front end integrated circuit and the front end integrated circuit 410, simultaneously.

According to an embodiment, the local oscillation frequency generator 422 may generate the first local oscillation (LO) frequency signal using the reference clock (for example, the first reference clock or the second reference clock) provided from the signal manager 421. The local oscillation frequency generator 422 may provide the first local oscillation frequency signal to another front end integrated circuit through the fourth port 414. The second local oscillation frequency signal generated by the local oscillation frequency generator included in another front end integrated circuit may be provided through the fourth port 414.

According to an embodiment, the local oscillation frequency generator 422 may receive one of the first reference clock or the second reference clock from the signal manager 421, and may generate the necessary first local oscillation frequency signal using an internal PLL. In an example, the local oscillation frequency generator 422 may not use the internal PLL and may receive the second local oscillation frequency signal from another front end integrated circuit, and may amplify and/or forward the second local oscillation frequency signal as a local oscillation frequency signal to be used internally. In an example, the local oscillation frequency generator 422 may use the generated first local oscillation frequency signal inside the front end integrated circuit 410, and simultaneously, may forward the first local oscillation frequency signal to another front end integrated circuit through the fourth port 414.

According to an embodiment, during a transmission operation, the first transmission intermediate frequency signal output by the signal manager 421 may be amplified by the first amplifier 423, and then, may be input to the first mixer 424. The first local oscillation frequency signal output by the local oscillation frequency generator 422 may be amplified by the second amplifier 425, and then, may be input to the first mixer 424. The first mixer 424 may up-convert the first transmission intermediate frequency signal into a radio frequency signal using the first local oscillation frequency, and may output the radio frequency signal.

According to an embodiment, during a reception operation, a reception radio frequency signal may be input to the second mixer 427. The first local oscillation frequency signal output by the local oscillation frequency generator 422 may be amplified by the third amplifier 428, and then, may be input to the second mixer 427. The second mixer 427 may down-convert the reception radio frequency signal into the first reception intermediate frequency signal using the first local oscillation frequency. The first reception intermediate frequency signal output from the second mixer 427 may be amplified by the fourth amplifier 426, and then, may be provided to the signal manager 421.

According to an embodiment, the first switch 429 may form one of a reception path or a transmission path of a radio frequency signal. The first switch 429 may form the transmission path for a transmission radio frequency signal provided from the first mixer 424 during a transmission operation, and may form the reception path to provide a reception radio frequency signal to the second mixer 427 during a reception operation.

According to an embodiment, the first splitter-combiner 431 may divide a transmission radio frequency signal into two signals or may combine two reception radio frequency signals into one reception radio frequency signal. For example, during a transmission operation, the first splitter-combiner 431 may divide a transmission radio frequency signal provided from the first switch 429 into two transmission radio frequency signals, and may provide the two transmission radio frequency signals to the second and third splitter-combiners 433, 435. For example, during a reception operation, the first splitter-combiner 431 may combine two reception radio frequency signals provided from the second and third splitter-combiner 433, 435 into one reception radio frequency signal, and may provide the combined reception radio frequency signal to the first switch 429.

According to an embodiment, the second splitter-combiner 433 may divide a transmission radio frequency signal provided by the first splitter-combiner 431 into two signals, or may combine two reception radio frequency signals into one reception radio frequency signal and may provide the reception radio frequency signal to the first splitter-combiner 431. For example, during a transmission operation, the second splitter-combiner 433 may divide a transmission radio frequency signal provided from the first splitter-combiner 431 into two transmission radio frequency signals, and may provide the two transmission radio frequency signals to the first and second phase shifters 441, 451 positioned on two transmission paths. For example, during a reception operation, the second splitter-combiner 433 may combine two reception radio frequency signals provided from the first and second phase shifters 441, 451 into one reception radio frequency signal, and may provide the combined reception radio frequency signal to the first splitter-combiner 431.

According to an embodiment, the third splitter-combiner 435 may divide a transmission radio frequency signal provided by the first splitter-combiner 431 into two signals, or may combine two reception radio frequency signals into one reception radio frequency signal and may provide the one reception radio frequency signal to the first splitter-combiner 431. For example, during a transmission operation, the third splitter-combiner 435 may divide a transmission radio frequency signal provided from the first splitter-combiner 431 into two transmission radio frequency signals, and may provide the two transmission radio frequency signals to the third and fourth phase shifters 461, 471 positioned on two transmission paths. For example, during a reception operation, the third splitter-combiner 435 may combine two reception radio frequency signals provided from the third and fourth phase shifters 461, 471 into one reception radio frequency signal, and may provide the combined reception radio frequency signal to the first splitter-combiner 431.

According to an embodiment, the front end integrated circuit 410 may include a plurality of transmission and reception circuits. All or a part of the plurality of transmission and reception circuits may include, for example, a power amplifier 447, 457, 467, 477, a low noise amplifier 445, 455, 465, 475, a phase shifter 441, 451, 461, 471, and/or a plurality of switches 443, 453, 463, 473, 449, 459, 469, 479.

According to an embodiment, the first to fourth phase shifters 441, 451, 461, 471 may shift a phase of one corresponding transmission radio frequency signal from among transmission radio frequency signals output from the second or third splitter-combiner 433, 435, and may apply the transmission radio frequency signal to one corresponding power amplifier from among the first to fourth power amplifiers 447, 457, 467, 477. For example, the first phase shifter 441 may shift a phase of the first transmission radio frequency signal output from the second splitter-combiner 433, and may apply the first transmission radio frequency signal to the first power amplifier 447 through the second switch 443. For example, the second phase shifter 451 may shift a phase of the second transmission radio frequency signal output from the second splitter-combiner 433, and may apply the second transmission radio frequency signal to the second power amplifier 457 through the third switch 453. For example, the third phase shifter 443 may shift a phase of a third transmission radio frequency signal output from the third splitter-combiner 435, and may apply the third transmission radio frequency signal to the third power amplifier 467 through the fourth switch 463. For example, the fourth phase shifter 471 may shift a phase of a fourth transmission radio frequency signal output from the third splitter-combiner 435, and may apply the fourth transmission radio frequency signal to the fourth power amplifier 477 through the fifth switch 473.

According to an embodiment, the first to fourth power amplifiers 447, 457, 467, 477 may amplify power of a transmission radio frequency signal provided from at least one corresponding phase shifter from among the first to fourth phase shifters 441, 451, 461, 471, and may output the transmission radio frequency signal. For example, the first power amplifier 447 may amplify power of the first transmission radio frequency signal provided from the first phase shifter 441, and may output the first transmission radio frequency signal. For example, the second power amplifier 457 may amplify power of the second transmission radio frequency signal provided from the second phase converter 451, and may output the second transmission radio frequency signal. For example, the third power amplifier 467 may amplify power of the third transmission radio frequency signal provided from the third phase shifter 461, and may output the third transmission radio frequency signal. For example, the fourth power amplifier 477 may amplify power of a fourth transmission radio frequency signal provided from the fourth phase shifter 471, and may output the fourth transmission radio frequency signal.

According to an embodiment, the transmission radio frequency signals output by the first to fourth power amplifiers 447, 457, 467, 477 may be forwarded to the plurality of antenna ports 415, 416, 417, 418 through at least one of the sixth to ninth switches 449, 459, 469, 479.

According to an embodiment, reception radio frequency signals input through the plurality of antenna ports 415, 416, 417, 418 may be forwarded to the first to fourth lower noise amplifiers 445, 455, 465, 475 through the sixth to ninth switches 449, 459, 469, 479.

According to an embodiment, the first to fourth low noise amplifiers 445, 455, 465, 475 may amplify power of the reception radio frequency signals provided through the sixth to ninth switches 449, 459, 469, 479, and may output the reception radio frequency signals. For example, the first low noise amplifier 445 may amplify power of the first reception radio frequency signal provided through the sixth switch 449, and may provide the first reception radio frequency signal to the first phase shifter 441 through the second switch 443. For example, the second low noise amplifier 455 may amplify power of the second reception radio frequency signal provided through the seventh switch 459, and may provide the second reception radio frequency signal to the second phase shifter 451 through the third switch 453. For example, the third low noise amplifier 465 may amplify power of a third reception radio frequency signal provided through the eighth switch 469, and may provide the third reception radio frequency signal to the third phase shifter 461 through the fourth switch 463. For example, the fourth low noise amplifier 475 may amplify power of a fourth reception radio frequency signal provided through the ninth switch 479, and may provide the fourth reception radio frequency signal to the fourth phase shifter 471 through the fifth switch 473.

According to an embodiment, the first to fourth phase shifters 441, 451, 461, 471 may shift phases of the reception radio frequency signals provided through the second to fifth switches 443, 453, 463, 473, and may apply the reception radio frequency signals to the second or third splitter-combiner 433, 435. For example, the first phase shifter 441 may shift the phase of the first reception radio frequency signal provided through the second switch 443, and may apply the first reception radio frequency signal to the second splitter-combiner 433. For example, the second phase shifter 451 may shift the phase of the second reception radio frequency signal provided through the third switch 453, and may apply the second reception radio frequency signal to the second splitter-combiner 433. For example, the third phase shifter 461 may shift the phase of the third reception radio frequency signal provided through the fourth switch 463, and may apply the third reception radio frequency signal to the third splitter-combiner 435. For example, the fourth phase shifter 471 may shift the phase of the fourth reception radio frequency signal provided through the fifth switch 473, and may apply the fourth reception radio frequency signal to the third splitter-combiner 435.

Figure 5:
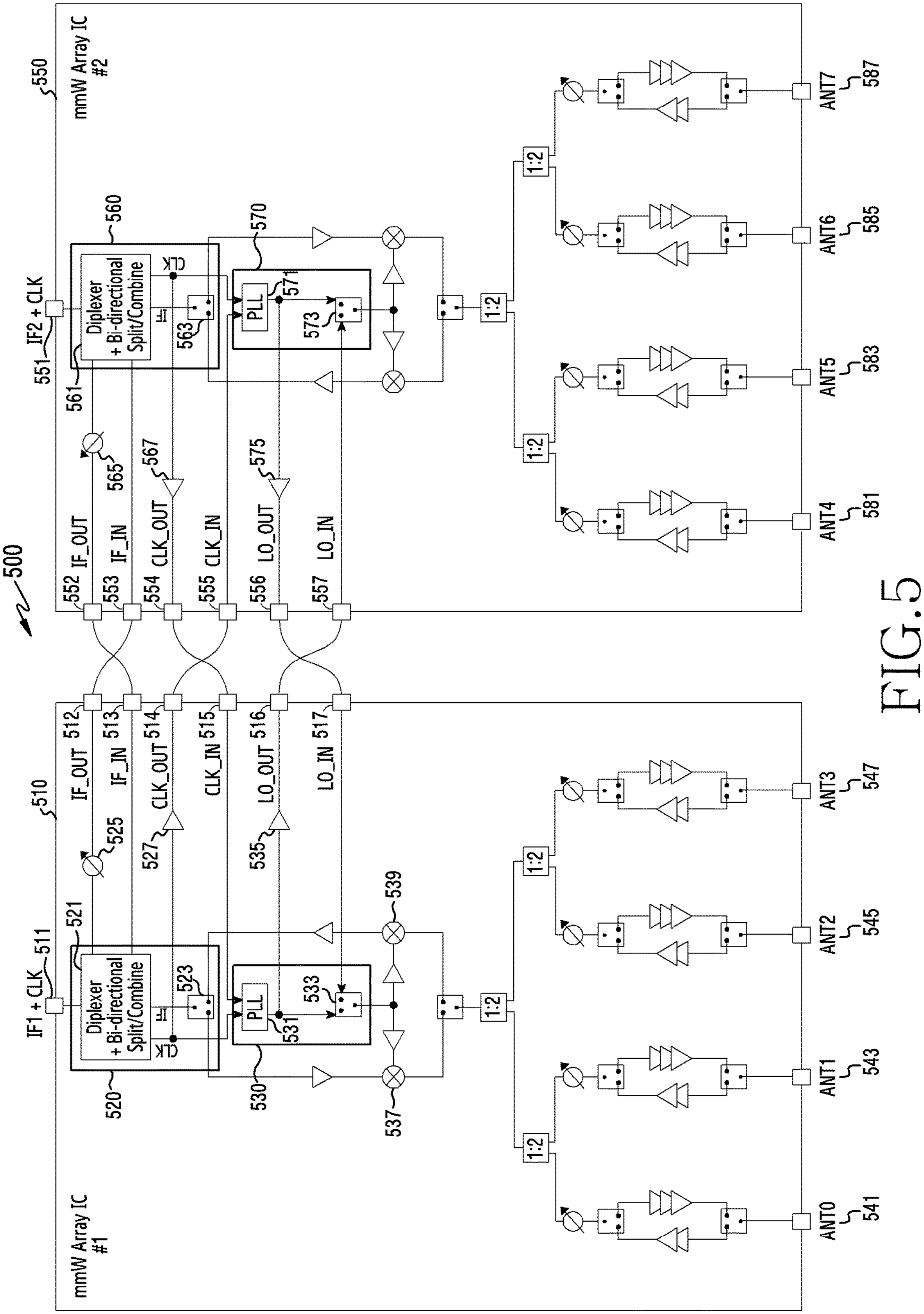
FIG. 5 is a diagram illustrating an example of electrically coupling a multi-front end integrated circuit including an antenna module in an electronic device according to various embodiments.

FIG. 5 is a diagram illustrating an example of electrically coupling a plurality of front end integrated circuits 510, 550 (for example, the first front end integrated circuit 321 or the second front end integrated circuit 323 of FIG. 3) included in an antenna module 500 (for example, the third antenna module 246 of FIG. 2) in an electronic device (for example, the electronic device 101 of FIG. 1) according to various embodiments.

Referring to FIG. 5, according to an embodiment, the antenna module 500 may include a first front end integrated circuit 510 and/or a second front end integrated circuit 550. For example, the first front end integrated circuit 510 and the second front end integrated circuit 550 may be electrically connected with each other using at least one port.

According to an embodiment, the first front end integrated circuit 510 may include a first port 511 for exchanging an intermediate frequency signal with a wireless communication circuit (for example, an IFIC), a plurality of antenna ports ANT0, ANT1, ANT2, ANT3 541, 543, 545, 547, or a plurality of interface ports 512, 513, 514, 515, 516, 517 for electrically coupling with the second front end integrated circuit 550. For example, the plurality of interface ports 512, 513, 514, 515, 516, 517 may include two ports IF_OUT, IF_IN 512, 513 for sharing an intermediate frequency signal (for example, the first transmission/reception intermediate frequency signal or the second transmission/reception intermediate frequency signal) with the second front end integrated circuit 550, two ports CLK_OUT, CLK_IN 514, 515 for sharing a reference clock (for example, the first reference clock or the second reference clock) with the second front end integrated circuit 550, or two ports LO_OUT, LO_IN 516, 517 for sharing a local oscillation frequency signal (for example, the first local oscillation frequency signal or the second local oscillation frequency signal) with the second front end integrated circuit 550.

According to an embodiment, the second front end integrated circuit 550 may include a first port 551 for exchanging an intermediate frequency signal with a wireless communication circuit (for example, an IFIC), a plurality of antenna ports ANT4, ANT5, ANT6, ANT7 581, 583, 585, 587, or a plurality of interface ports 552, 553, 554, 555, 556, 557 for electrically coupling with the first front end integrated circuit 510. For example, the plurality of interface ports 552, 553, 554, 555, 556, 557 may include second and third ports IF_OUT, IF_IN 552, 553 for sharing an intermediate frequency signal (for example, the first transmission/reception intermediate frequency signal or the second transmission/reception intermediate frequency signal) with the first front end integrated circuit 510, fourth and fifth ports CLK_OUT, CLK_IN 554, 555 for sharing a reference clock (for example, the first reference clock or the second reference clock) with the first front end integrated circuit 510, or sixth and seventh ports LO_OUT, LO_IN 556, 557 for sharing a local oscillation frequency signal (for example, the first local oscillation frequency signal or the second local oscillation frequency signal) with the first front end integrated circuit 510.

According to an embodiment, the second port IF_OUT 512 of the first front end integrated circuit 510 may be electrically connected with the third port IF_IN 553 of the second front end integrated circuit 550. For example, the third port IF_IN 513 of the first front end integrated circuit 510 may be electrically connected with the second port IF_OUT 552 of the second front end integrated circuit 550. For example, a first intermediate frequency signal output through the second port IF_OUT 512 of the first front end integrated circuit 510 may be input to the third port IF_IN 553 of the second front end integrated circuit 550. A second intermediate frequency signal output through the second port IF_OUT 552 of the second front end integrated circuit 550 may be input to the third port IF_IN 513 of the first front end integrated circuit 510.

According to an embodiment, the fourth port CLK_OUT 514 of the first front end integrated circuit 510 may be electrically connected with the fifth port CLK_IN 555 of the second front end integrated circuit 550. For example, the fifth port CLK_IN 515 of the first front end integrated circuit 510 may be electrically connected with the fourth port CLK_OUT 554 of the second front end integrated circuit 550. For example, a first reference clock output through the fourth port CLK_OUT 514 of the first front end integrated circuit 510 may be input to the fifth port CLK_IN 555 of the second front end integrated circuit 550. A second reference clock output through the fourth port CLK_OUT 554 of the second front end integrated circuit 550 may be input to the fifth port CLK_IN 515 of the first front end integrated circuit 510.

According to an embodiment, the sixth port LO_OUT 516 of the first front end integrated circuit 510 may be electrically connected with the seventh port LO_IN 557 of the second front end integrated circuit 550. For example, the seventh port LO_IN 517 of the first front end integrated circuit 510 may be electrically connected with the sixth port LO_OUT 556 of the second front end integrated circuit 550. For example, a first local oscillation frequency signal output through the sixth port LO_OUT 516 of the first front end integrated circuit 510 may be input to the seventh port LO_IN 557 of the second front end integrated circuit 550. A second local oscillation frequency signal output through the sixth port LO_OUT 556 of the second front end integrated circuit 550 may be input to the seventh port LO_IN 517 of the first front end integrated circuit 510.

According to an embodiment, a signal manager 520 included in the first front end integrated circuit 510 may include a diplexer/splitter-combiner 521 or a switching circuit 523.

For example, the diplexer/splitter-combiner 521 may separate a first transmission intermediate frequency signal or the first reference clock from a signal input from a wireless communication circuit (for example, an IFIC) through the first port 511. The first transmission intermediate frequency signal output by the diplexer/splitter-combiner 521 may be phase-shifted by a phase shifter 525, and then, may be output through the second port IF_OUT 512. The diplexer/splitter-combiner 521 may receive a second transmission/reception intermediate frequency signal output from the second port IF_OUT 552 of the second front end integrated circuit 550 through the third port IF_IN 513. The first reference clock output by the diplexer/splitter-combiner 521 may be amplified by an amplifier 527, and then, may be output through the fourth port CLK_OUT 514. The diplexer/splitter-combiner 521 may receive the second reference clock output from the fourth port CLK_OUT 554 of the second front end integrated circuit 550 through the fifth port CLK_IN 515.

For example, according to an operation mode, the switching circuit 523 may forward a transmission intermediate frequency signal (for example, the first transmission intermediate frequency signal or the second transmission intermediate frequency signal) output from the diplexer/splitter-combiner 521 to a mixer 537 (for example, the first mixer 424 of FIG. 4) on a transmission path, or may transmit a first reception intermediate frequency signal output from a mixer 539 (for example, the second mixer 427 of FIG. 4) on a reception path to the diplexer/splitter-combiner 521.

According to an embodiment, a local oscillation frequency generator 530 included in the first front end integrated circuit 510 may include a PLL 531 or a switching circuit 533.

For example, the PLL 531 may generate the first local oscillation frequency signal using a reference clock (for example, the first reference clock or the second reference clock) output by the signal manager 520. The first local oscillation frequency signal output by the PLL 531 may be amplified by an amplifier 535, and then, may be output through the sixth port LO_OUT 516.

For example, the switching circuit 533 may selectively output one of the first local oscillation frequency signal output from the PLL 531 and the second local oscillation frequency signal output from the sixth port LO_OUT 556 of the second front end integrated circuit 550 through the seventh port LO_IN 517. The first or second local oscillation frequency signal output by the switching circuit 533 may be forwarded to the mixer 537 (for example, the first mixer 424 of FIG. 4) on the transmission path or may be forwarded to the mixer 539 (for example, the second mixer 427 of FIG. 4) on the reception path.

According to an embodiment, the second front end integrated circuit 550 may include substantially the same components (for example, a signal manager 560 including a diplexer/splitter-combiner 561 or a switching circuit 563, a local oscillation frequency generator 570 including a PLL 571 or a switching circuit 573) as the first front end integrated circuit 510. In an embodiment, characteristics of the components included in the second front end integrated circuit 550 may be different from characteristics of the components included in the first front end integrated circuit 510.

Figure 6:
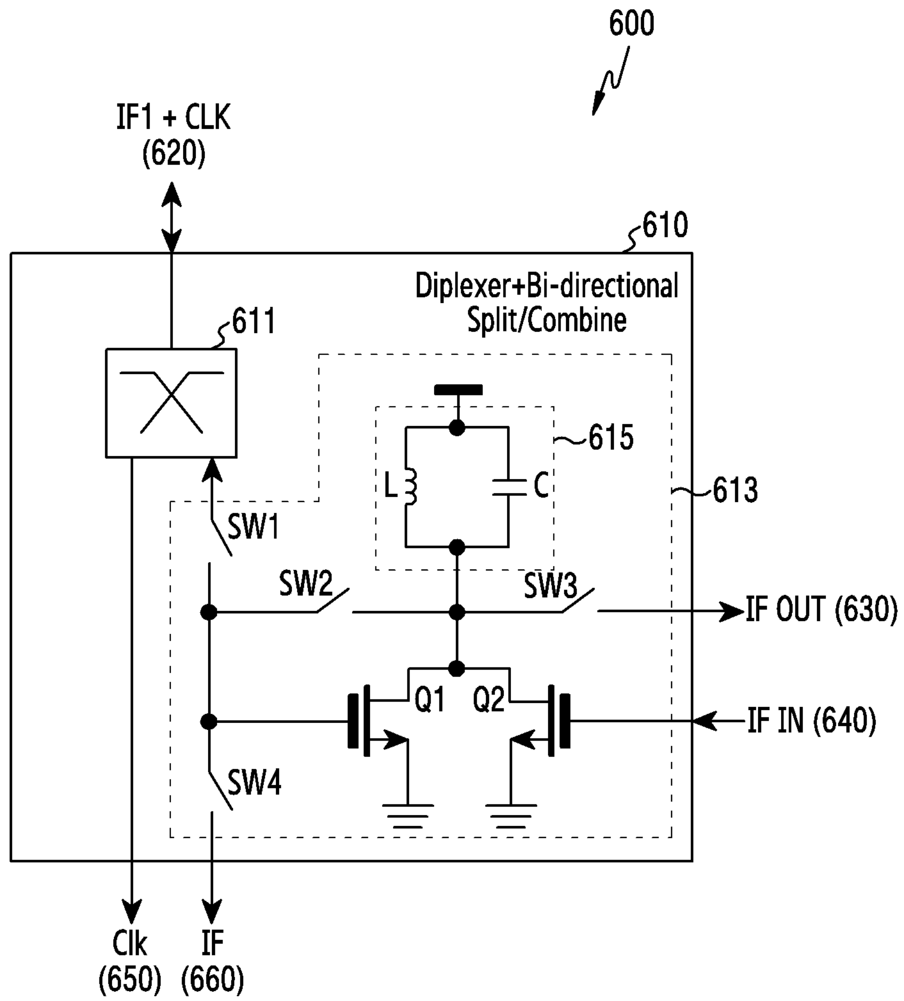
FIG. 6 is a diagram illustrating an example of a diplexer/a splitter-combiner included in a front end integrated circuit in an electronic device according to various embodiments.

FIG. 6 is a diagram illustrating an example of a diplexer/splitter-combiner 610 (for example, the diplexer/splitter-combiner 521 of FIG. 5) included in a front end integrated circuit 600 (for example, the first front end integrated circuit 321 or the second front end integrated circuit 323 of FIG. 3) in an electronic device (for example, the electronic device 101 of FIG. 1) according to various embodiments.

Referring to FIG. 6, the diplexer/splitter-combiner 610 according to an embodiment may include a structure in which a transmission buffer and a reception buffer are not distinguished from each other. The diplexer/splitter-combiner 610 may include, for example, a diplexer 611 or a switching circuit 613 (for example, the switching circuit 523 of FIG. 5). The switching circuit 613 may include a plurality of switches SW1, SW2, SW3, SW4, a buffer circuit 615 (e.g., a common source amplifier having an LC resonator) and/or two field effect transistors (FETs) Q1, Q2.

According to an embodiment, the diplexer 611 may divide a signal (IF+CLK signal) 620 input from a wireless communication circuit (for example, an IFIC) into a first transmission intermediate frequency signal (IF signal) 660 and a first reference clock (CLK) 650, or may forward an intermediate frequency signal (for example, a received intermediate frequency signal) to the wireless communication circuit (for example, the IFIC).

According to an embodiment, the plurality of switches SW1, SW2, SW3, SW4 included in the switching circuit 613 may form an internal transmission path for transmitting the first transmission intermediate frequency signal divided by the diplexer 611, or a forwarding path for providing the first transmission intermediate frequency signal to another front end integrated circuit (for example, the second front end integrated circuit 550 of FIG. 5). For example, a first intermediate frequency signal IF OUT 630 may be output to another front end integrated circuit (for example, the second front end integrated circuit 550 of FIG. 5) through the forwarding path formed by the plurality of switches SW1, SW2, SW3, SW4 included in the switching circuit 613.

According to an embodiment, the plurality of switches SW1, SW2, SW3, SW4 included in the switching circuit 613 may form a forwarding path for forwarding a second intermediate frequency signal IF IN 640 provided from another front end integrated circuit (for example, the second front end integrated circuit 550 of FIG. 5) to the diplexer 611 to provide to the wireless communication circuit (for example, the IFIC), or may form an internal transmission path for transmitting the second intermediate frequency signal. For example, the second intermediate frequency signal IF IN 640 may be input from another front end integrated circuit (for example, the second front end integrated circuit 550 of FIG. 5) through the forwarding path formed by the plurality of switches SW1, SW2, SW3, SW4 included in the switching circuit 613.

According to an embodiment, the buffer circuit 615 may amplify the first intermediate frequency signal IF OUT 630 provided by the wireless communication circuit (for example, the IFIC) to be forwarded to another front end integrated circuit (for example, the second front end integrated circuit 550 of FIG. 5), and may output the first intermediate frequency signal. In an example, the buffer circuit 615 may amplify and output the second intermediate frequency signal IF IN 640 provided from another front end integrated circuit (for example, the second front end integrated circuit 550 of FIG. 5) to transmit, or may amplify and output the second intermediate frequency signal IF IN 640 provided from another front end integrated circuit (for example, the second front end integrated circuit 550 of FIG. 5) to forward to the wireless communication circuit (for example, the IFIC).

Figure 12A:
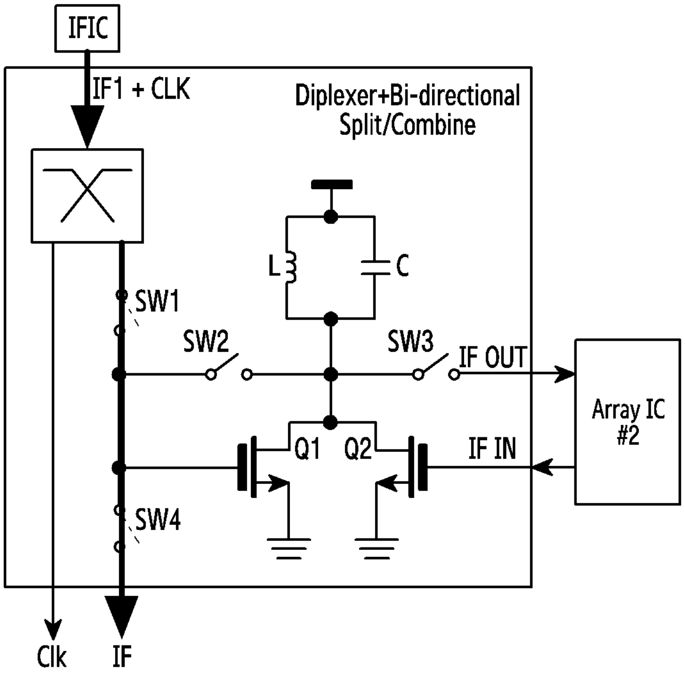
FIG. 12A is a diagram illustrating an example of a transmission/reception operation in a front end integrated circuit of an electronic device according to various embodiments.

FIG. 12A is a diagram illustrating an example of a transmission/reception operation in a front end integrated circuit (the first front end integrated circuit 321 or the second front end integrated circuit 323 of FIG. 3) 410 of an electronic device (for example, the electronic device 101 of FIG. 1) according to various embodiments.

Figure 12B:
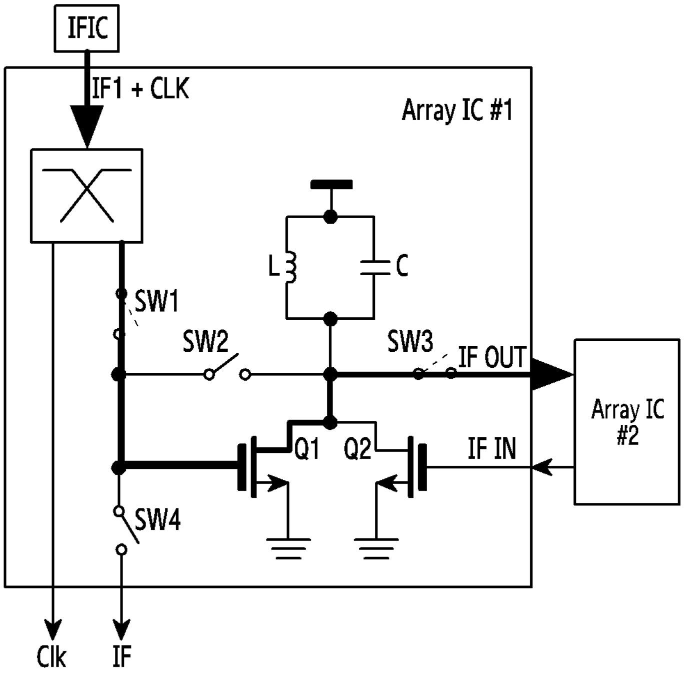
FIG. 12B is a diagram illustrating an example of a transmission/reception operation in a front end integrated circuit of an electronic device according to various embodiments.

FIG. 12B is a diagram illustrating an example of a transmission/reception operation in a front end integrated circuit 410 of an electronic device according to various embodiments.

Figure 12C:
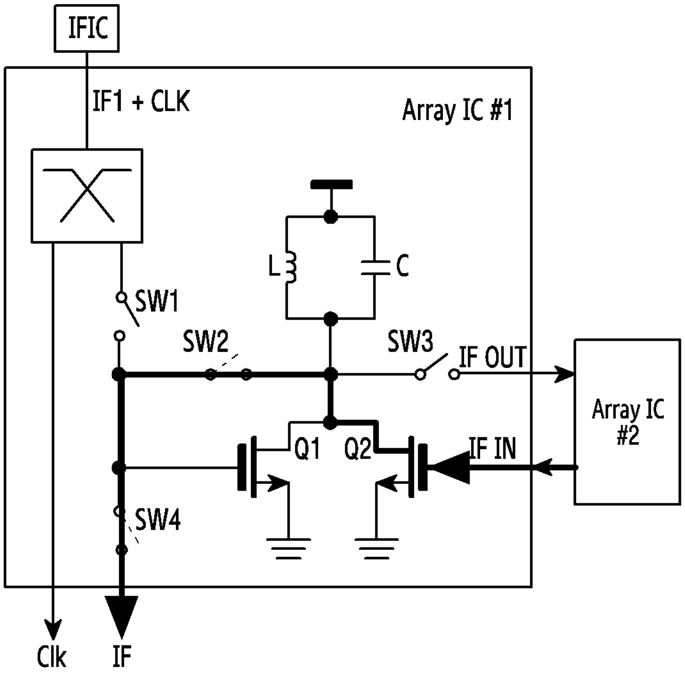
FIG. 12C is a diagram illustrating an example of a transmission/reception operation in a front end integrated circuit of an electronic device according to various embodiments.

FIG. 12C is a diagram illustrating an example of a transmission/reception operation in a front end integrated circuit 410 of an electronic device according to various embodiments.

Figure 12D:
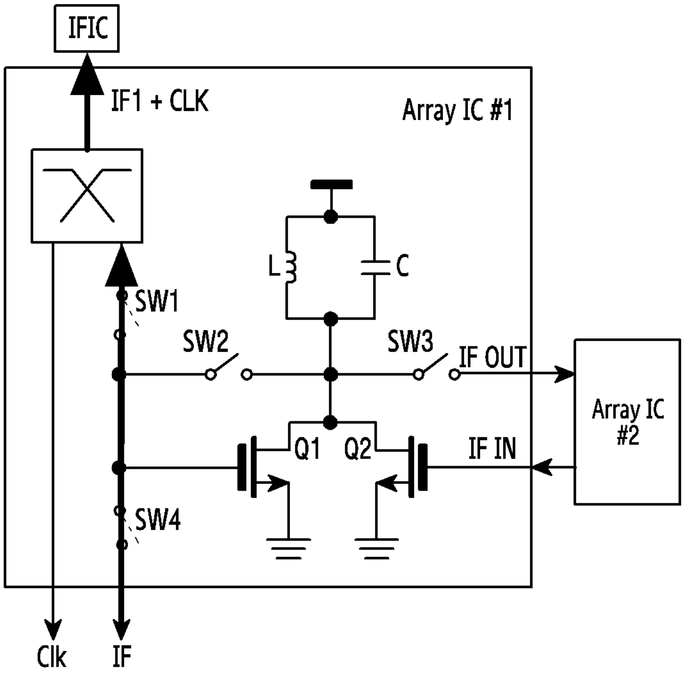
FIG. 12D is a diagram illustrating an example of a transmission/reception operation in a front end integrated circuit of an electronic device according to various embodiments.

FIG. 12D is a diagram illustrating an example of a transmission/reception operation in a front end integrated circuit 410 of an electronic device according to various embodiments.

Figure 12E:
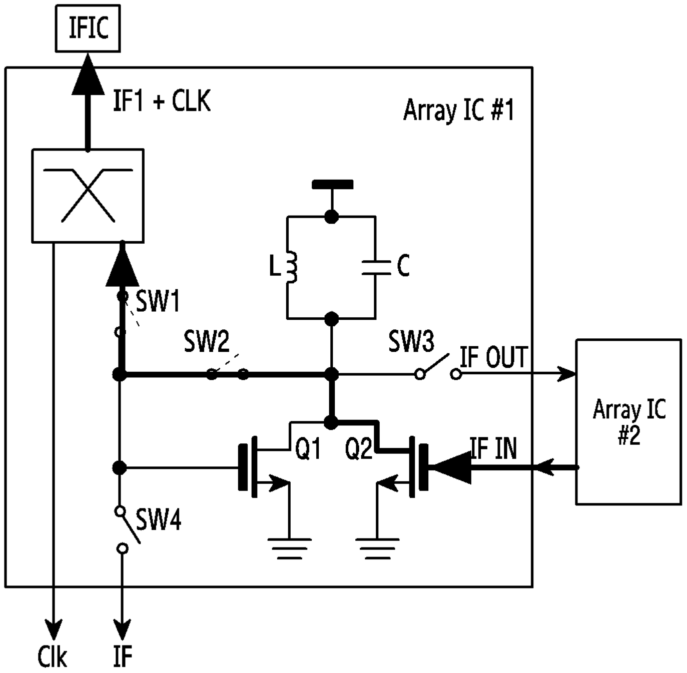
FIG. 12E is a diagram illustrating an example of a transmission/reception operation in a front end integrated circuit of an electronic device according to various embodiments.

FIG. 12E is a diagram illustrating an example of a transmission/reception operation in a front end integrated circuit 410 of an electronic device according to various embodiments.

Figure 12F:
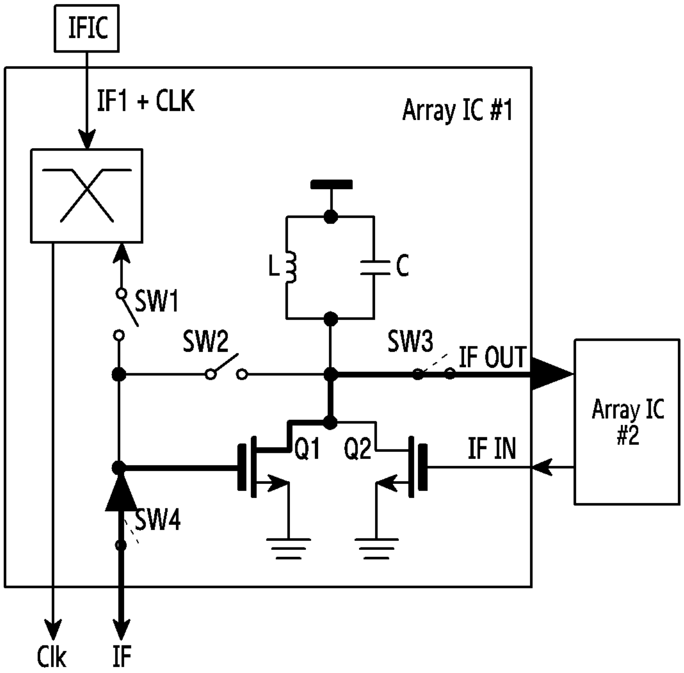
FIG. 12F is a diagram illustrating an example of a transmission/reception operation in a front end integrated circuit of an electronic device according to various embodiments.

FIG. 12F is a diagram illustrating an example of a transmission/reception operation in a front end integrated circuit 410 of an electronic device according to various embodiments.

Referring to FIG. 12A, FIG. 12B, FIG. 12C, FIG. 12D, FIG. 12E and FIG. 12F, first to fourth switches SW1, SW2, SW3, SW4 included in a switching circuit according to an embodiment may form a transmission path or a reception path of an intermediate frequency signal as follows.

Referring to FIG. 12A, when a first transmission intermediate frequency signal (for example, an intermediate frequency signal output by the diplexer 611 of FIG. 6) is intended to be transmitted, the electronic device 101 may turn on the first switch SW1 and the fourth switch SW4 and may turn off the second switch SW2 or the third switch SW3. In this case, a transmission path may be formed to output the first transmission intermediate frequency signal, to block a second transmission intermediate frequency signal 640 provided from another front end integrated circuit (for example, the second front end integrated circuit 550 of FIG. 5), and to block the first transmission intermediate frequency signal from being provided to another front end integrated circuit (for example, the second front end integrated circuit 550 of FIG. 5).

Referring to FIG. 12B, when the first transmission intermediate frequency signal is intended to be transmitted through another front end integrated circuit (for example, the second front end integrated circuit 550 of FIG. 5), the electronic device 101 may turn on the first switch SW1 and the third switch SW3 and may turn off the second switch SW2 and the fourth switch SW4. In this case, a forwarding path may be connected to provide the first transmission intermediate frequency signal to another front end integrated circuit (for example, the second front end integrated circuit 550 of FIG. 5). In addition, a transmission path of the first transmission intermediate frequency signal and the second transmission intermediate frequency signal provided from another front end integrated circuit (for example, the second front end integrated circuit 550 of FIG. 5) may be blocked.

Referring to FIG. 12C, when the second transmission intermediate frequency signal provided by another front end integrated circuit (for example, the second front end integrated circuit 550 of FIG. 5) is intended to be transmitted, the electronic device 101 may turn on the second switch SW2 and the fourth switch SW4 and may turn off the first switch SW1 and the third switch SW3. In this case, a transmission path may be connected to output the second transmission intermediate frequency signal (660). In addition, a path for outputting the first transmission intermediate frequency signal or providing to another front end integrated circuit (for example, the second front end integrated circuit 550 of FIG. 5) may be blocked.

Referring to FIG. 12D, when an intermediate frequency signal is intended to be received, the electronic device 101 may turn on the first switch SW1 and the fourth switch SW4 and may turn off the second switch SW2 and the third switch SW3. In this case, a reception path may be connected to forward a received first reception intermediate frequency signal to a diplexer (for example, the diplexer 611 of FIG. 6). In addition, a forwarding path for providing the first reception intermediate frequency signal to another front end integrated circuit (for example, the second front end integrated circuit 550 of FIG. 5) may be blocked.

Referring to FIG. 12E, when a second reception intermediate frequency signal provided by another front end integrated circuit (for example, the second front end integrated circuit 550 of FIG. 5) is intended to be received, the electronic device 101 may turn on the first switch SW1 and the second switch SW2 and may turn off the third switch SW3 and the fourth switch SW4. In this case, a reception path may be connected to forward the second reception intermediate frequency signal to a wireless communication circuit (for example, an IFIC) through the diplexer (for example, the diplexer 611 of FIG. 6). In addition, a path for forwarding the second reception intermediate frequency signal to a transmission path may be blocked.

Referring to FIG. 12F, when the first reception intermediate frequency signal is intended to be transmitted to another front end integrated circuit (for example, the second front end integrated circuit 550 of FIG. 5), the electronic device 101 may turn on the third switch SW3 and the fourth switch SW4 and may turn off the first switch SW1 and the second switch SW2. In this case, a transmission path may be connected to forward the first reception intermediate frequency signal to another front end integrated circuit (for example, the second front end integrated circuit 550 of FIG. 5). In addition, a reception path for forwarding the first reception intermediate frequency signal to the wireless communication circuit (for example, the IFIC) through the diplexer (for example, the diplexer 611 of FIG. 6) may be blocked.

Figure 7:
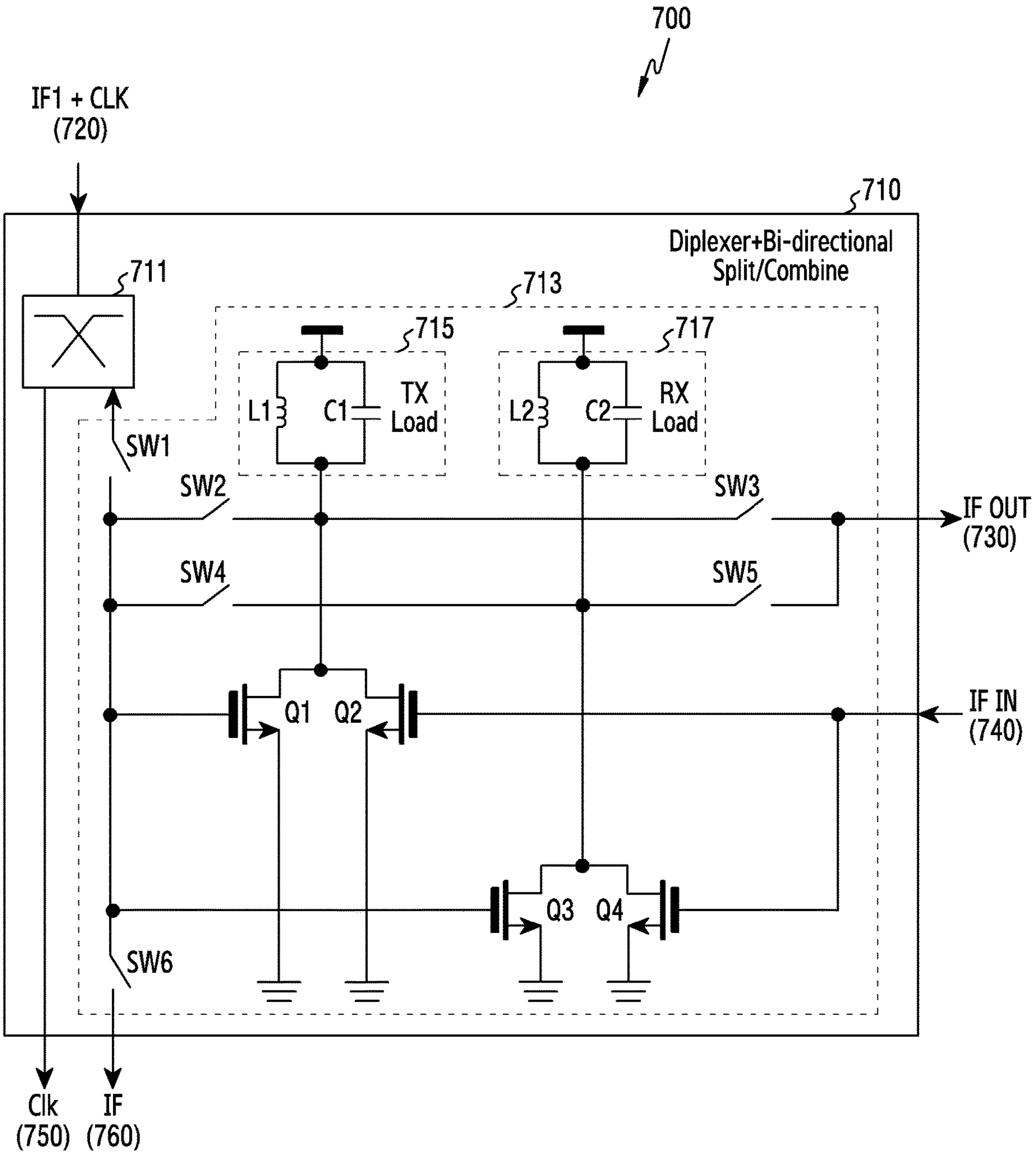
FIG. 7 is a diagram illustrating an example of a diplexer/a splitter-combiner included in a front end integrated circuit in an electronic device according to various embodiments.

FIG. 7 is a diagram illustrating an example of a diplexer/splitter-combiner (for example, the diplexer/splitter-combiner 521 of FIG. 5) 710 included in a front end integrated circuit 700 (for example, the first front end integrated circuit 321 or the second front end integrated circuit 323 of FIG. 3) in an electronic device (for example, the electronic device 101 of FIG. 1) according to various embodiments.

Referring to FIG. 7, the diplexer/splitter-combiner 710 according to an embodiment may include a transmission buffer 715 and/or a reception buffer 717 since characteristics of linearity of a buffer circuit, a noise figure and/or a gain are different according to a type of an intermediate frequency signal (for example, the first transmission/reception intermediate frequency signal or the second transmission/reception intermediate frequency signal).

According to an embodiment, the diplexer/splitter-combiner 710 may include a diplexer 711, a switching circuit 713 (for example, the switching circuit 523 of FIG. 5). For example, the switching circuit 713 may include a plurality of switches SW1, SW2, SW3, SW4, SW5, SW6, two buffer circuits 715, 717 (a common source amplifier having an LC resonator), or four FETs Q1, Q2, Q3, Q4.

According to an embodiment, the diplexer 711 may divide a signal (IF+CLK signal) 720 received from a wireless communication circuit (for example, an IFIC) into a first transmission intermediate frequency signal (IF signal) 760 and a first reference clock (CLK) 750, or may forward a received intermediate frequency signal (for example, a first reception intermediate frequency signal received through an antenna, or a second reception intermediate frequency signal provided from another front end integrated circuit (for example, the second front end integrated circuit 550 of FIG. 5)) to the wireless communication circuit (for example, the IFIC).

According to an embodiment, the plurality of switches SW1, SW2, SW3, SW4, SW5, SW6 included in the switching circuit 713 may form a transmission path for transmitting the first transmission intermediate frequency signal divided by the diplexer 711, or a forwarding path for providing to another front end integrated circuit (for example, the second front end integrated circuit 550 of FIG. 5). Through the forwarding path, the second transmission intermediate frequency signal IF OUT 730 may be output.

According to an embodiment, the plurality of switches SW1, SW2, SW3, SW4, SW5, SW6 included in the switching circuit 713 may form a forwarding path for forwarding a second intermediate frequency signal (for example, the second transmission intermediate frequency signal or the second reception intermediate frequency signal) IF IN 740 provided from another front end integrated circuit (for example, the second front end integrated circuit 550 of FIG. 5) to the diplexer 711 to provide to the wireless communication circuit (for example, the IFIC), or a transmission path for transmitting.

According to an embodiment, at least one buffer circuit 715 of the two buffer circuits 715, 717 may amplify a first intermediate frequency signal to be forwarded to another front end integrated circuit (for example, the second front end integrated circuit 550 of FIG. 5), and may output the first intermediate frequency signal. In an example, at least one buffer circuit 717 of the two buffer circuits 715, 717 may amplify and output the second intermediate frequency signal IF IN 740 provided from another front end integrated circuit (for example, the second front end integrated circuit 550 of FIG. 5). The amplified second intermediate frequency signal may be output to be transmitted, or may be forwarded to the diplexer 711.

Figure 13A:
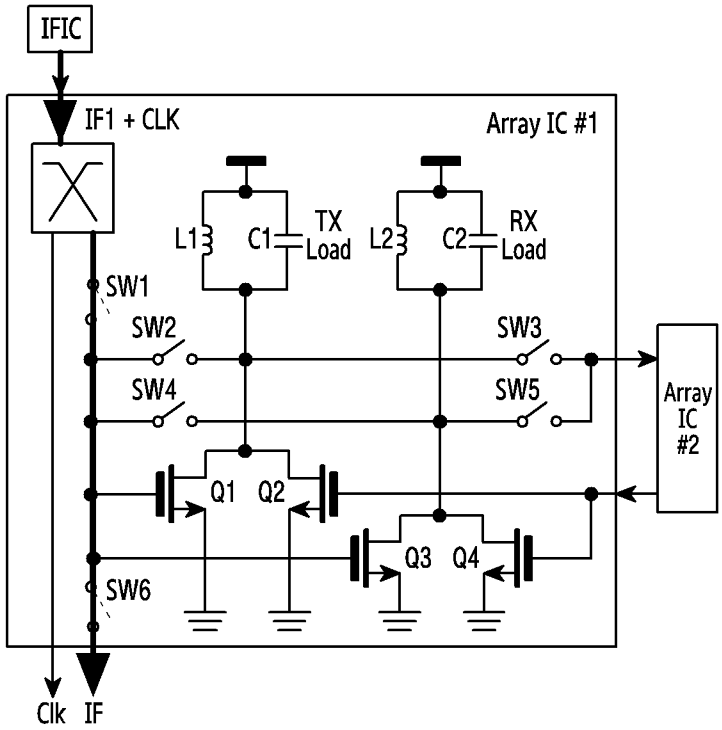
FIG. 13A is a diagram illustrating an example of a transmission/reception operation in a front end integrated circuit of an electronic device according to various embodiments.

FIG. 13A is a diagram illustrating an example of a transmission/reception operation in a front end integrated circuit (for example, the first front end integrated circuit 321 or the second front end integrated circuit 323 of FIG. 3) 410 of an electronic device (for example, the electronic device 101 of FIG. 1) according to various embodiments.

Figure 13B:
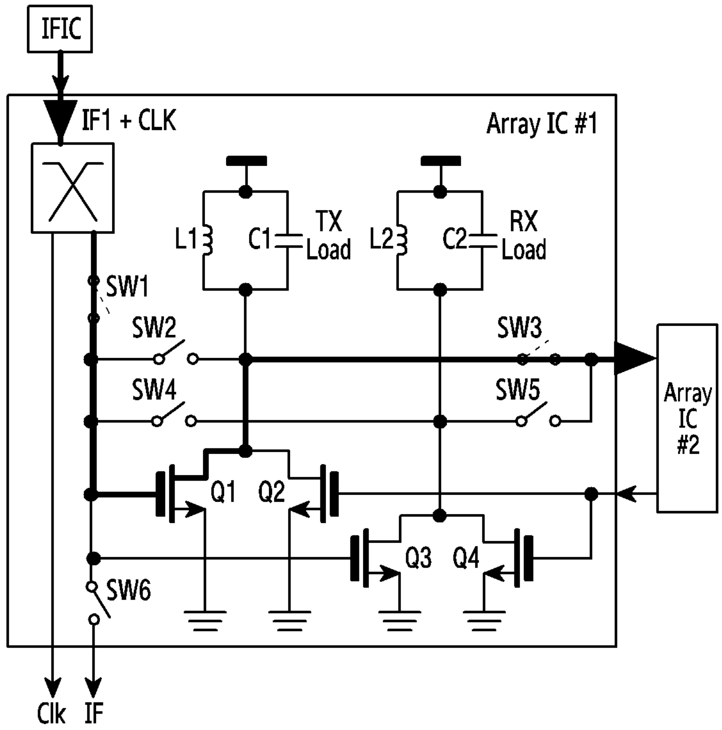
FIG. 13B is a diagram illustrating an example of a transmission/reception operation in a front end integrated circuit of an electronic device according to various embodiments.

FIG. 13B is a diagram illustrating an example of a transmission/reception operation in a front end integrated circuit of an electronic device according to various embodiments.

Figure 13C:
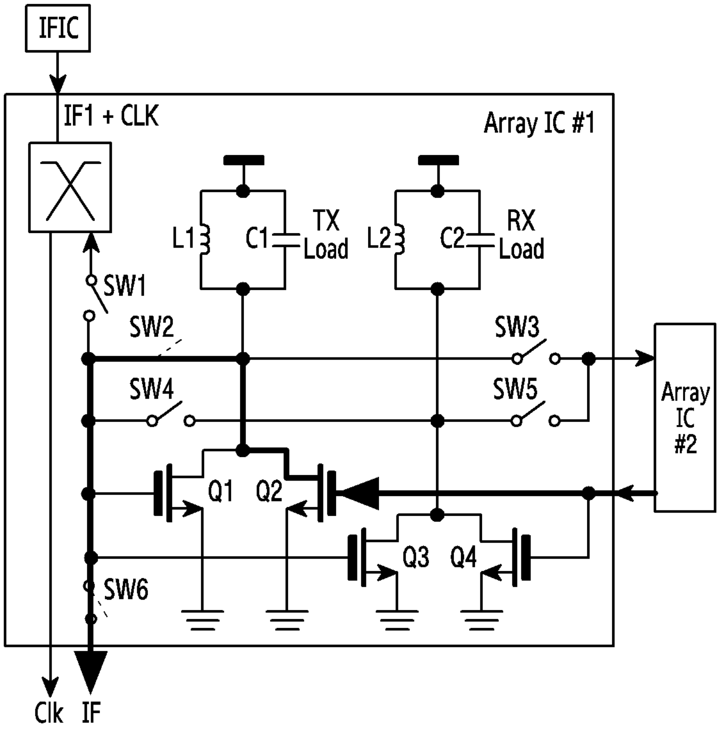
FIG. 13C is a diagram illustrating an example of a transmission/reception operation in a front end integrated circuit of an electronic device according to various embodiments.

FIG. 13C is a diagram illustrating an example of a transmission/reception operation in a front end integrated circuit of an electronic device according to various embodiments.

Figure 13D:
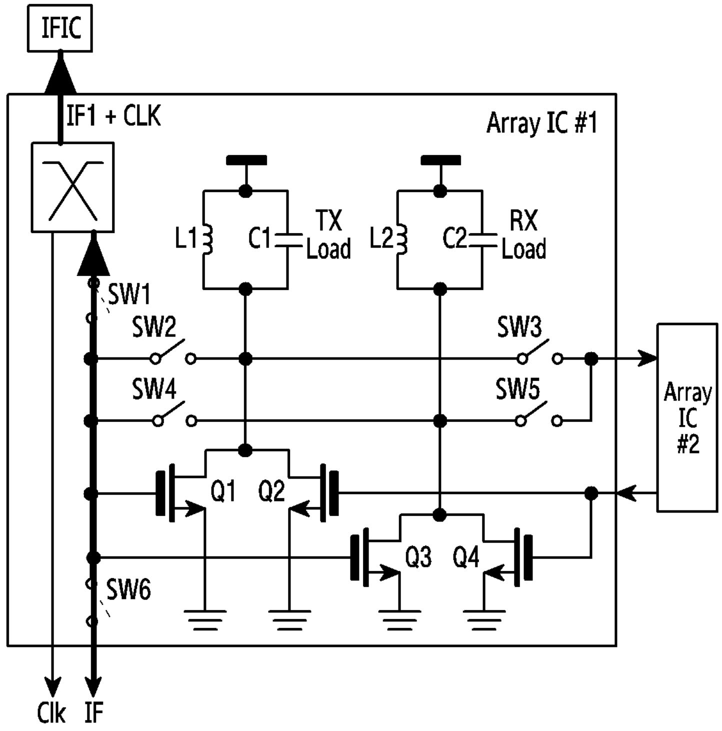
FIG. 13D is a diagram illustrating an example of a transmission/reception operation in a front end integrated circuit of an electronic device according to various embodiments.

FIG. 13D is a diagram illustrating an example of a transmission/reception operation in a front end integrated circuit of an electronic device according to various embodiments.

Figure 13E:
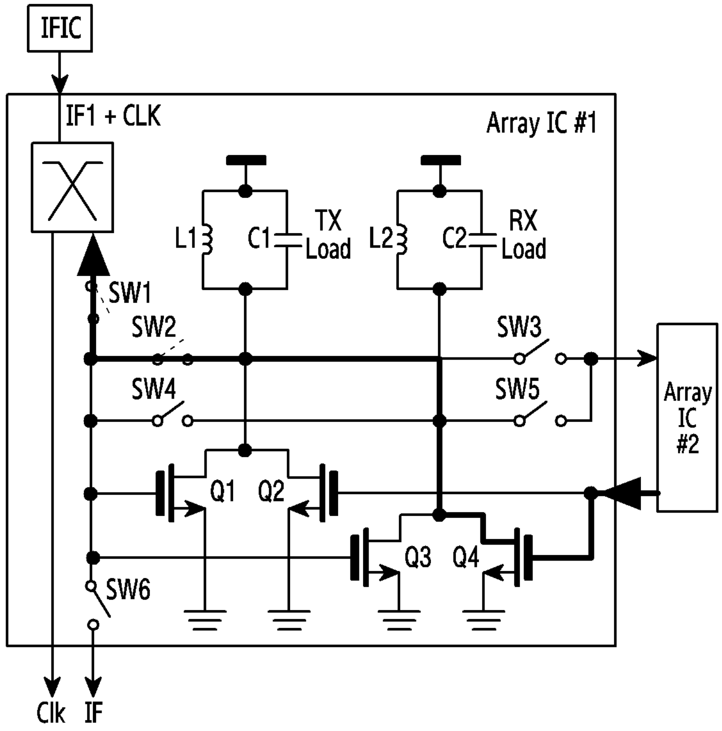
FIG. 13E is a diagram illustrating an example of a transmission/reception operation in a front end integrated circuit of an electronic device according to various embodiments.

FIG. 13E is a diagram illustrating an example of a transmission/reception operation in a front end integrated circuit of an electronic device according to various embodiments.

Figure 13F:
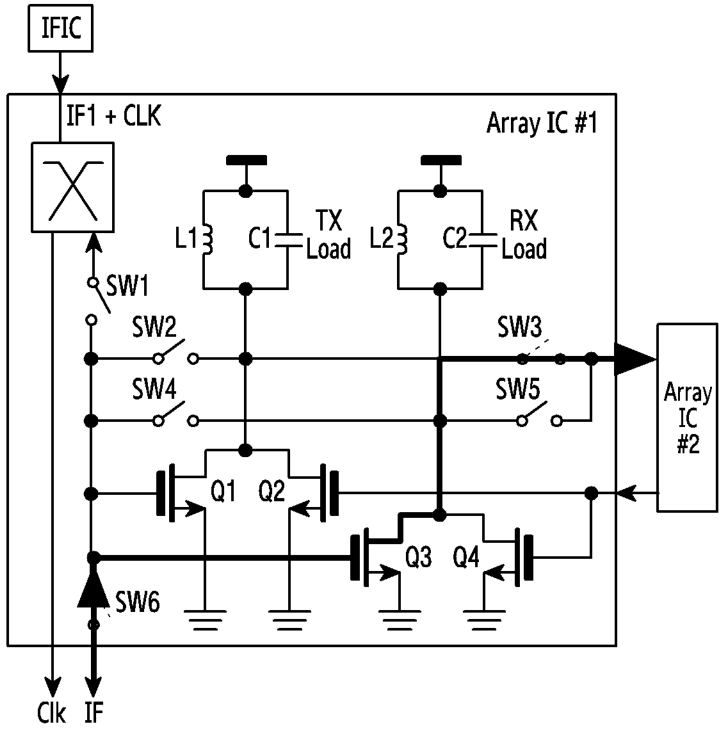
FIG. 13F is a diagram illustrating an example of a transmission/reception operation in a front end integrated circuit of an electronic device according to various embodiments.

FIG. 13F is a diagram illustrating an example of a transmission/reception operation in a front end integrated circuit of an electronic device according to various embodiments.

Referring to FIG. 13A, FIG. 13B, FIG. 13C, FIG. 13D, FIG. 13E and FIG. 13F, first to sixth switches SW1, SW2, SW3, SW4, SW5, SW6 included in a switching circuit according to an embodiment may form a transmission path or a reception path of an intermediate frequency signal as follows.

Referring FIG. 13A, when a first transmission intermediate frequency signal output by a diplexer (for example, the diplexer 711 of FIG. 7) is intended to be transmitted, the electronic device 101 may turn on the first switch SW1 and the sixth switch SW6 and may turn off the second switch SW2, the third switch SW3, the fourth switch SW4, and the fifth switch SW5. For example, a transmission path for outputting a first intermediate frequency signal output by the diplexer 711 (for example, for outputting the transmission intermediate frequency signal of FIG. 7 (760)) may be connected, and a transmission path for outputting a second intermediate frequency signal provided from another front end integrated circuit (for example, the second front end integrated circuit 550 of FIG. 5) may be blocked. In an example, a forwarding path for providing the first transmission intermediate frequency signal output by the diplexer (for example, the diplexer 711 of FIG. 7) to another front end integrated circuit (for example, the second front integrated circuit 550 of FIG. 5) may be blocked.

Referring FIG. 13B, when the first transmission intermediate frequency signal output by the diplexer (for example, the diplexer 711 of FIG. 7) is intended to be transmitted through another front end integrated circuit (for example, the second front end integrated circuit 550 of FIG. 5), the electronic device 101 may turn on the first switch SW1 and the third switch SW3, and may turn off the second switch SW2, the fourth switch SW4, the fifth switch SW5, or the sixth switch SW6. For example, a forwarding path for providing the first transmission intermediate frequency signal output by the diplexer (for example, the diplexer 711 of FIG. 7) to another front end integrated circuit (for example, the second front end integrated circuit 550 of FIG. 5) may be connected. In an example, a transmission path for outputting the second intermediate frequency signal provided from another front end integrated circuit (for example, the second front end integrated circuit 550 of FIG. 5), and the first transmission intermediate frequency signal may be blocked.

Referring FIG. 13C, when a second transmission intermediate frequency signal provided by another front end integrated circuit (for example, the second front end integrated circuit 550 of FIG. 5) is intended to be transmitted, the electronic device 101 may turn on the second switch SW2 and the sixth switch SW6, and may turn off the first switch SW1, the third switch SW3, the fourth switch SW4, or the fifth switch SW5. For example, a transmission path for outputting the second transmission intermediate frequency signal (for outputting the transmission intermediate frequency signal of FIG. 7 (760)) may be connected. In an example, a transmission path for outputting the first transmission intermediate frequency signal output by the diplexer 711 (for outputting the transmission intermediate frequency signal of FIG. 7 (760)), and a forwarding path for providing to another front end integrated circuit (for example, the second front end integrated circuit 550 of FIG. 5) may be blocked.

Referring to FIG. 13D, when a first reception intermediate frequency signal is intended to be received, the electronic device 101 may turn on the first switch SW1 and the sixth switch SW6, and may turn off the second switch SW2, the third switch SW3, the fourth switch SW4, the fifth switch SW5. For example, a reception path for forwarding the received first reception intermediate frequency signal to a wireless communication circuit (for example, an IFIC)

through the diplexer (for example, the diplexer 711 of FIG. 7) may be connected, and a forwarding path for providing to another front end integrated circuit (for example, the second front end integrated circuit 550 of FIG. 5) may be blocked.

Referring to FIG. 13E, when a second reception intermediate frequency signal provided by another front end integrated circuit (for example, the second front end integrated circuit 550 of FIG. 5) is intended to be received, the electronic device 101 may turn on the first switch SW1 and the second switch SW2, and may turn off the third switch SW3, the fourth switch SW4, the fifth switch SW5, or the sixth switch SW6. For example, a reception path for forwarding the second reception intermediate frequency signal to the wireless communication circuit (for example, the IFIC) through the diplexer (for example, the diplexer 711 of FIG. 7) may be connected, and the second reception intermediate frequency signal may be blocked from being forwarded to a transmission path.

Referring to FIG. 13F, when the first reception intermediate frequency signal is intended to be received by another front end integrated circuit (for example, the second front end integrated circuit 550 of FIG. 5), the electronic device 101 may turn on the third switch SW3 and the sixth switch SW6, and may turn off the first switch SW1, the second switch SW2, the fourth switch SW4, or the fifth switch SW5. For example, a forwarding path for providing the received first reception intermediate frequency signal to another front end integrated circuit (for example, the second front end integrated circuit 550 of FIG. 5) may be connected, and a reception path for forwarding to the wireless communication circuit (for example, the IFIC) through the diplexer (for example, the diplexer 711 of FIG. 7) may be blocked.

Figure 8:
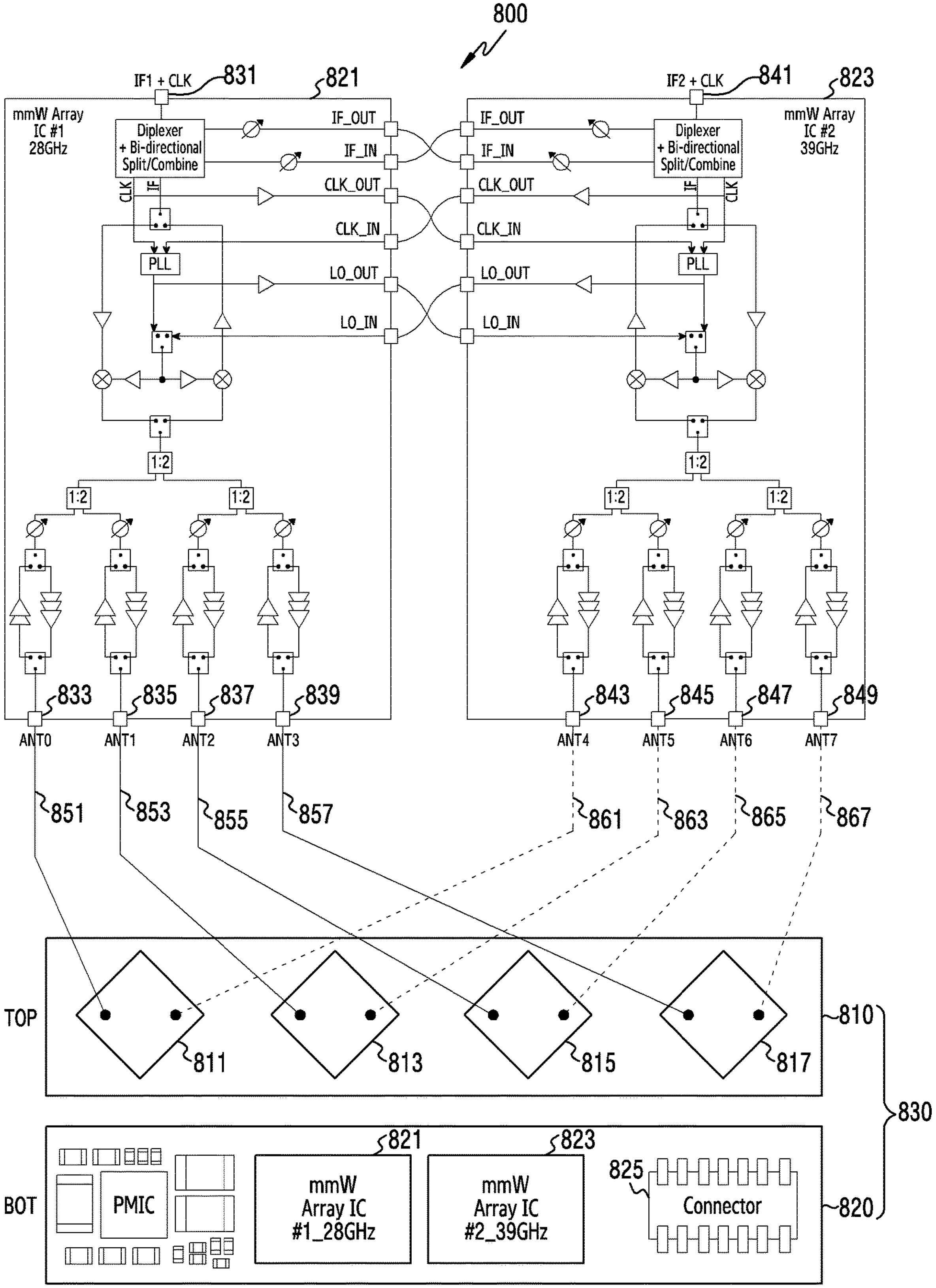
FIG. 8 is a diagram illustrating an implementation example using a multi-front end integrated circuit in an electronic device according to various embodiments.

FIG. 8 is a diagram 800 illustrating an implementation example using a plurality of front end integrated circuits 821, 823 (for example, the first front end integrated circuit 321 or the second front end integrated circuit 323 of FIG. 3) in an electronic device (for example, the electronic device 101 of FIG. 1) according to various embodiments.

Referring to FIG. 8, two front end integrated circuits 821, 823 disposed on a second surface 820 of a PCB 830 included in an antenna module according to an embodiment may be electrically connected with a wireless communication circuit (for example, an IFIC) through at least one port of two ports 831, 841. The two front end integrated circuits 821, 823 may support wireless communication in a dual band. The first front end integrated circuit 821 of the two front end integrated circuits 821, 823 may service, for example, a band of about 28 GHz, and the second front end integrated circuit 823 may service, for example, a band of about 32 GHz.

According to an embodiment, the first front end integrated circuit 821 of the two front end integrated circuits 821, 823 may have four antenna ports ANT0, ANT1, ANT2, ANT3 833, 835, 837, 839 electrically connected with antenna elements 811, 813, 815, 817, which are disposed on a first surface 810 of the PCB 830 or are disposed inside the PCB 830 closer to the first surface 810 than to the second surface 820, through wires 851, 853, 855, 857. The wires 851, 853, 855, 857 may include vias penetrating through at least a portion of the PCB 830 to electrically connect the antenna elements 811, 813, 815, 817 to the four antenna ports ANT0, ANT1, ANT2, ANT3 (833, 835, 837, 839).

According to an embodiment, the second front end integrated circuit 823 of the two front end integrated circuits 821, 823 may have four antenna ports ANT4, ANT5, ANT6, ANT7 (843, 845, 847, 849) electrically connected with the antenna elements 811, 813, 815, 817, which are disposed on the first surface 810 of the PCB 830 or are disposed inside the PCB 830 closer to the first surface 810 than to the second surface 820, through wires 861, 863, 865, 867. The wires 861, 863, 865, 867 may include vias penetrating through the PCB 830 to electrically connect the antenna elements 811, 813, 815, 817 and the four antenna ports ANT4, ANT5, ANT6, ANT7 (843, 845, 847, 849).

According to an embodiment, when the antenna module 800 supports a band of about 28 GHz, only the first front end integrated circuit 821 may be used. In an example, when the antenna module 800 supports a band of about 32 GHz, only the second front end integrated circuit 823 may be used.

According to an embodiment, a connector 825 may physically or electrically connect the first and/or second front end integrated circuits 821, 823 to another PCB (for example, a main PCB).

Figure 9:
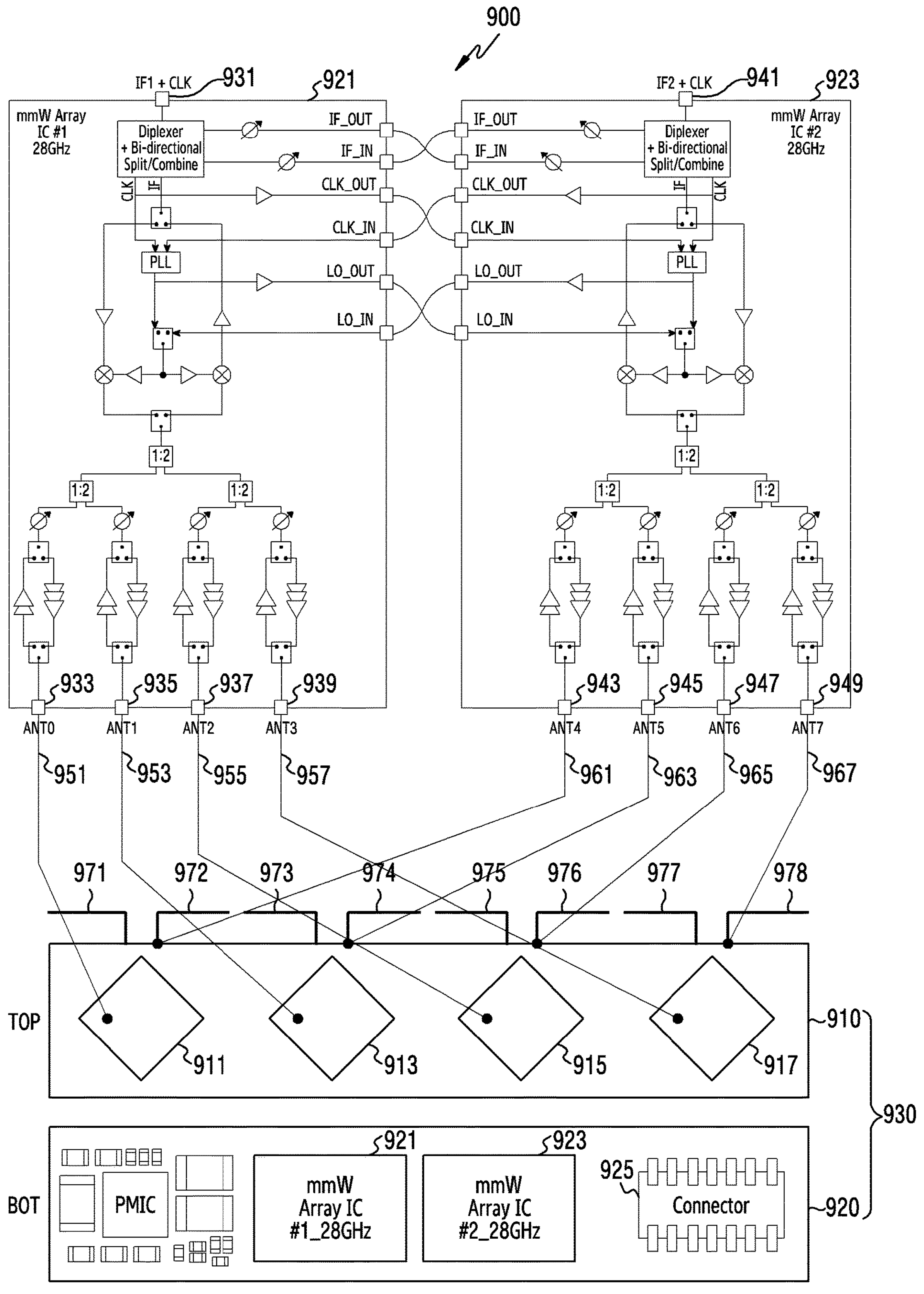
FIG. 9 is a diagram illustrating an implementation example using a multi-front end integrated circuit in an electronic device according to various embodiments.

FIG. 9 is a diagram 900 illustrating an implementation example using a plurality of front end integrated circuits 921, 923 (for example, the first front end integrated circuit 321 or the second front end integrated circuit 323 of FIG. 3) in an electronic device (for example, the electronic device 101 of FIG. 1) according to an embodiment.

Referring to FIG. 9, according to an embodiment, two front end integrated circuits 921, 923 separately disposed on a second surface 920 of a PCB 920 included in an antenna module 900 may be electrically connected with a wireless communication circuit (for example, an IFIC) through at least one of two ports 931, 941. Each of the two front end integrated circuits 921, 923 may support wireless communication in a single band. The two front end integrated circuits 921, 923 may service the same frequency band, for example, a band of about 28 GHz. In an example, the two front end integrated circuits 921, 923 may service different frequency bands (for example, a band of about 28 GHz or a band of about 32 GHz).

According to an embodiment, the first front end integrated circuit 921 of the two front end integrated circuits 921, 923 may have four antenna ports ANT0, ANT1, ANT2, ANT3 (933, 935, 937, 939) electrically connected with antenna elements 911, 913, 915, 917, which are disposed on a first surface 910 of the PCB 930 or are disposed inside the PCB 930 closer to the first surface 910 than to the second surface 920, through wires 951, 953, 955, 957. In an example, the second front end integrated circuit 923 of the two front end integrated circuits 921, 923 may have four antenna ports ANT4, ANT5, ANT6, ANT7 (943, 945, 947, 949) electrically connected with antenna elements 972, 974, 976, 978, which are disposed on the PCB 930, through wires 961, 963, 965, 967. The wires 951, 953, 955, 957 may include, for example, vias penetrating through at least a portion of the PCB 930 to electrically connect the antenna elements 911, 913, 915, 917, which are disposed on the first surface 910 or inside the PCB 930 closer to the first surface 910 than to the second surface 920, with the four antenna ports ANT0, ANT1, ANT2, ANT3 (933, 935, 937, 939) disposed on the second surface 920. For example, the antenna elements 911, 913, 915, 917 may be patch antennas. In an example, the antenna elements 971, 972, 973, 974, 975, 976, 977, 978 may be dipole antennas.

According to an embodiment, the second front end integrated circuit 923 of the two front end integrated circuits 921, 923 may have the four antenna ports ANT4, ANT5, ANT6, ANT7 (943, 945, 947, 949) electrically connected with the antenna elements 971, 972, 973, 974, 975, 976, 977, 978 disposed on the PCB 930 through the wires 961, 963, 965, 967. The wires 961, 963, 965, 967 may include for example, vias penetrating through at least a portion of the PCB 930 to electrically connect the antenna elements 971,

972, 973, 974, 975, 976, 977, 978 with the four antenna ports ANT4, ANT5, ANT6, ANT7 (943, 945, 947, 949) disposed on the second surface 920.

According to an embodiment, the first antenna array including the antenna elements 911, 913, 915, 917, and the second antenna array including the antenna elements 971, 972, 973, 974, 975, 976, 977, 978 may form beamforming in different directions. For example, the first antenna array may form a main beam in a first direction, and the second antenna array may form a main beam in a second direction substantially perpendicular to the first direction. In an embodiment, when the antenna module 900 performs communication by forming a beam in the first direction, only the first front end integrated circuit 921 may be used. In an example, when the antenna module performs communication by forming a beam in the second direction, only the second front end integrated circuit 923 may be used.

Figure 10:
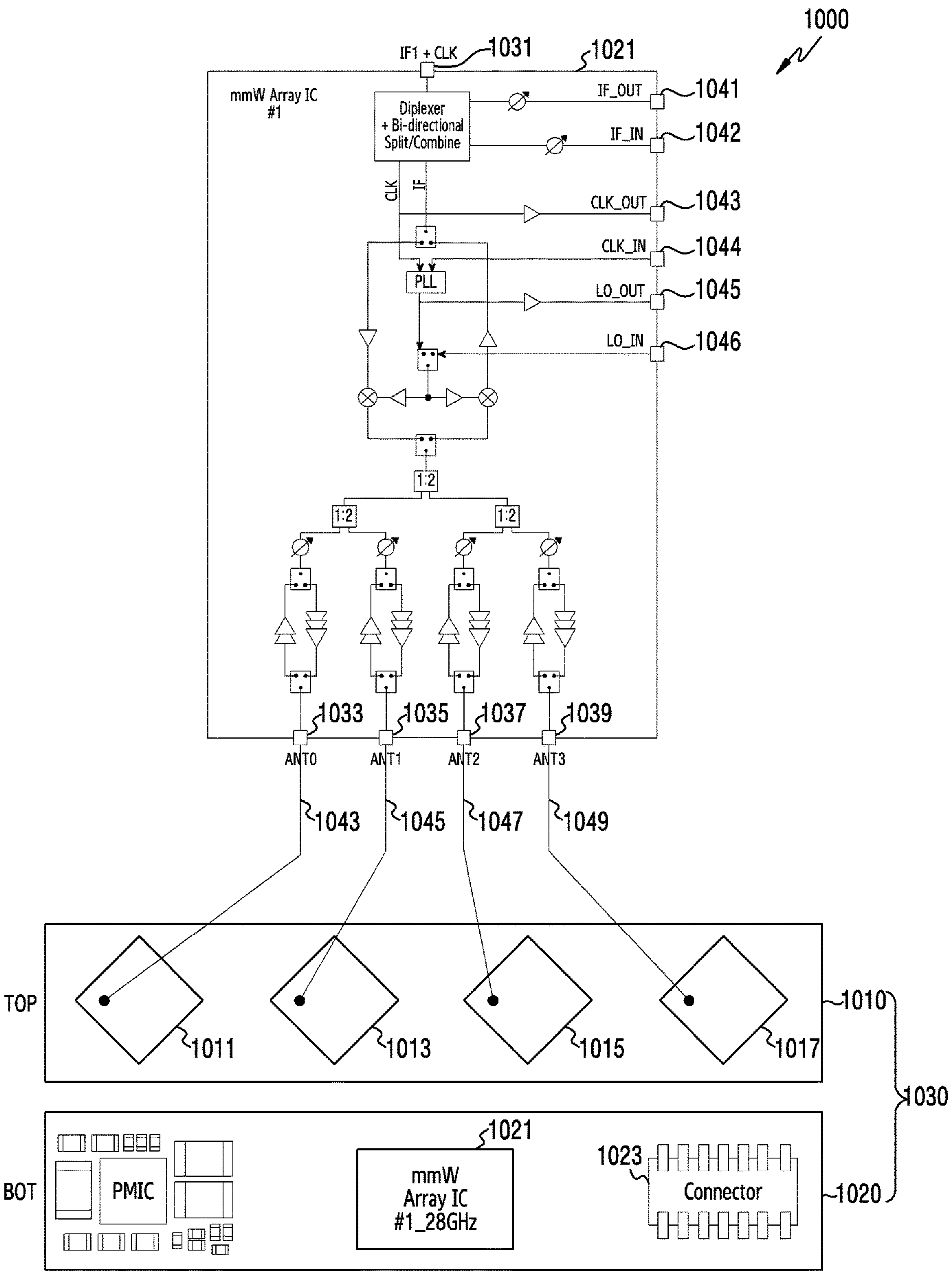
FIG. 10 is a diagram illustrating an implementation example using a single front end integrated circuit in an electronic device according to various embodiments.

FIG. 10 is a diagram 1000 illustrating an implementation example using a front end integrated circuit (for example, the first front end integrated circuit 321 or the second front end integrated circuit 323 of FIG. 3) 1021 in an electronic device (for example, the electronic device 101 of FIG. 1) according to various embodiments.

Referring to FIG. 10, according to an embodiment, the front end integrated circuit 1021 on a second surface 1020 of a PCB 1030 included in an antenna module 1000 may be electrically connected with a wireless communication circuit (for example, an IFIC) through one port 1031. The front end integrated circuit 1021 may support wireless communication in a single band. The front end integrated circuit 1021 may service, for example, a band of 28 GHz.

According to an embodiment, the front end integrated circuit 1021 may have four antenna ports ANT0, ANT1, ANT2, ANT3 (1033, 1035, 1037, 1039) electrically connected with antennal elements 1011, 1013, 1015, 1017, which are disposed on a first surface 1010 of the PCB 1030 or inside the PCB 1030 closer to the first surface 1010 than to the second surface 1020, through wires 1043, 1045, 1047, 1049. The wires 1043, 1045, 1047, 1049 may include, for example, vias penetrating through at least a portion of the PCB 1030 to electrically connect the antenna elements 1011, 1013, 1015, 1017 with the four antenna ports ANT0, ANT1, ANT2, ANT3 (1033, 1035, 1037, 1039).

According to an embodiment, the front end integrated circuit 1021 may include a plurality of ports 1041, 1042, 1043, 1044, 1045, 1046 for coupling with another front end integrated circuit. For example, the plurality of ports included in the front end integrated circuit 1021 may be electrically connected to wires which are designed on the second surface 1020 of the PCB 1030.

As can be seen from the embodiments which are implemented according to various embodiments of the antenna module (mmW module) of FIGS. 8 to 10, the front end integrated circuit is implemented in plural number, so that circuits wasted in various antenna combinations and band combinations can be reduced and a configuration optimized for various implementations can be achieved.

Figure 11A:
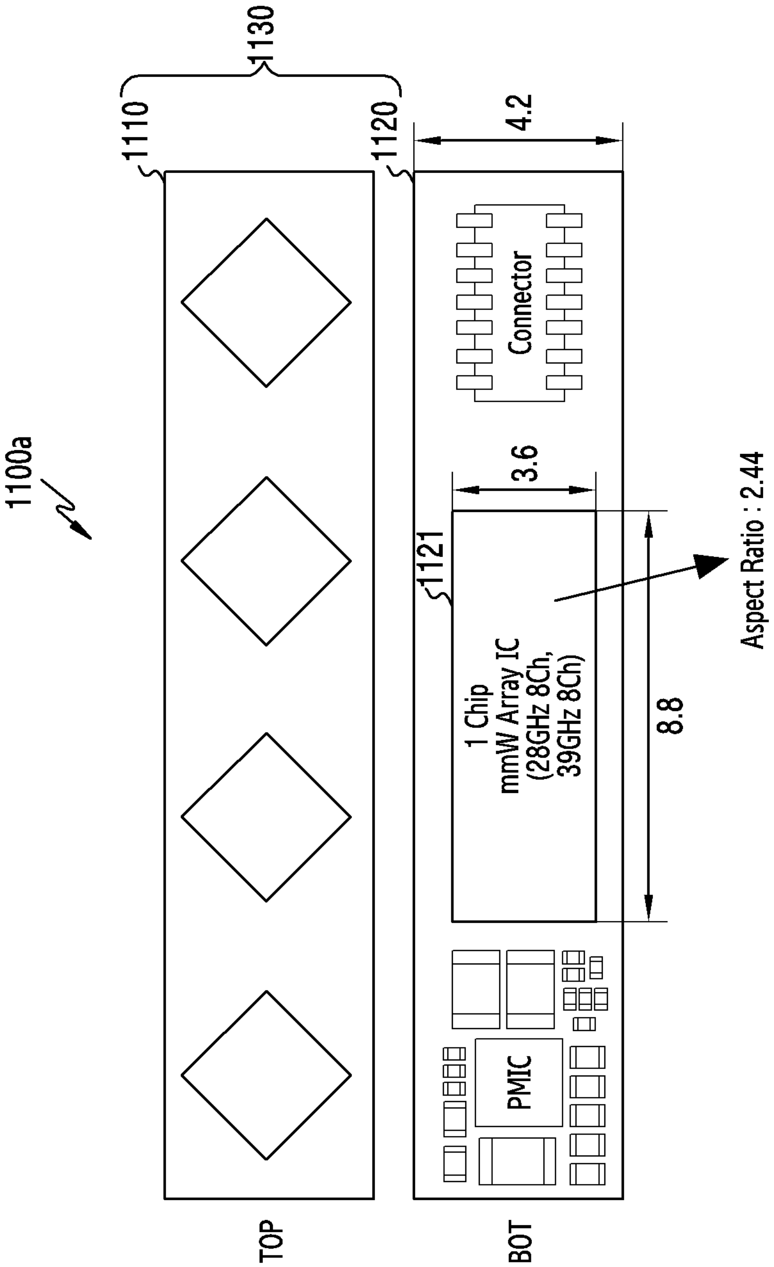
FIG. 11A is a diagram illustrating an example of a PCB in which a normal antenna module is designed.
Figure 11B:
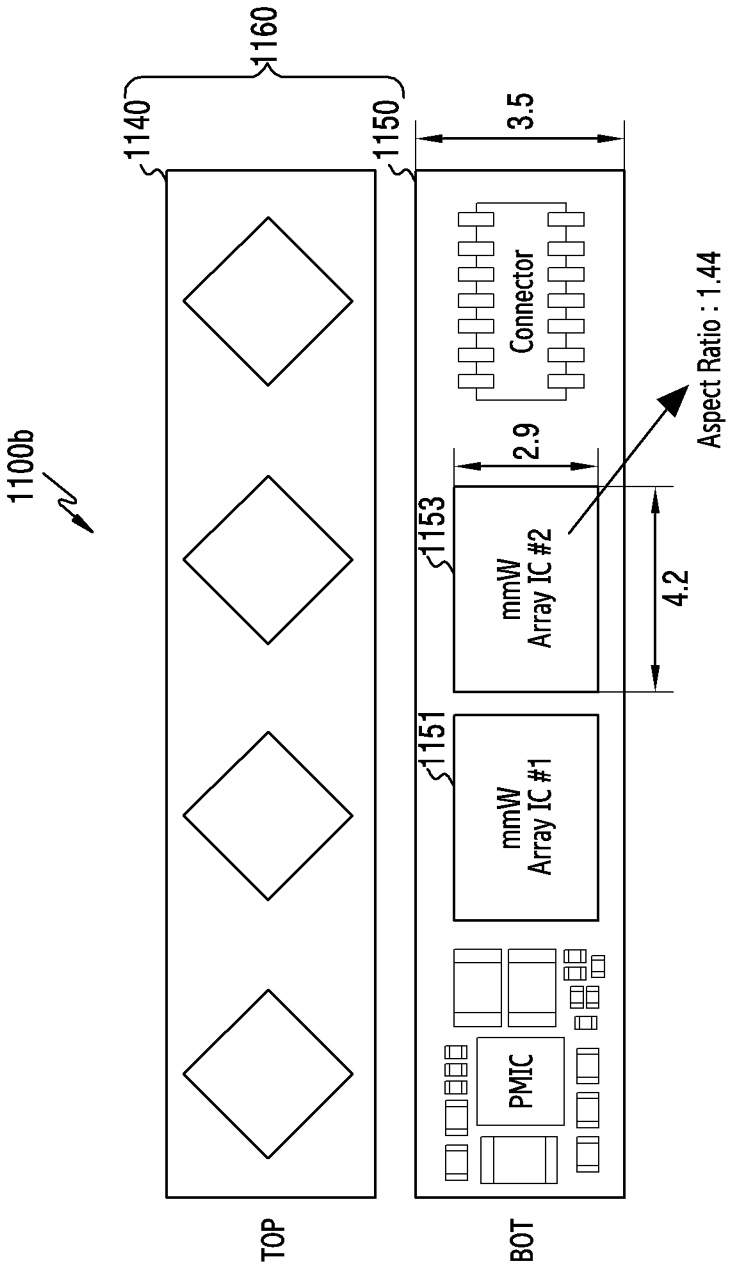
FIG. 11B is a diagram illustrating an example of a PCB in which an antenna module is designed according to various embodiments.

FIG. 11A is a diagram illustrating an example of an antenna module 1100*a* according to a comparison example, and FIG. 11B is a diagram illustrating an example of an antenna module 1100*b* according to various embodiments.

Referring to FIG. 11A, a PCB 1130 included in the antenna module 1100*a* according to the comparison example may have a first surface 1110 and a second surface 1120, and one front end integrated circuit 1121 may be disposed on the second surface 1120. For example, if a design rule defining a vertical width (Y-Dim) of the PCB 1130 as about 4.2 mm is considered, a maximum vertical width (Y-Dim) of the front end integrated circuit 1121 may be about 3.6 mm. To integrate a maximum 32-chain array circuit structure into the front end integrated circuit 1121 with the vertical width (Y-Dim) being fixed to about 3.6 mm as described above, a horizontal width (X-Dim) of the front end integrated circuit 1121 may be about 8.8 mm. In this case, the aspect ratio may be about 2.44. The design rule refers to a design rule that defines a width of a wire, a gap between wires to minimize occurrence of a defect and an error in designing an electronic circuit and designing a wire pattern.

According to a structure of the electronic device, the vertical width of the antenna module may be reduced. This results in reduction in the maximum vertical width (Max Y-Dim) of the front end integrated circuit 1121. For example, if the vertical width (Y-Dim) of the antenna module is about 3.5 mm, the maximum vertical width (Max Y-Dim) of the front end integrated circuit may be about 2.9 mm. Accordingly, even if the degree of IC integration is enhanced and the horizontal width (X-Dim) is maintained the same as in the above-described example, that is, as about 8.8 mm, the aspect ratio of the front end integrated circuit may exceed 3 which is regarded as a manufacturing limit value. This may cause the IC to break or to be misaligned in a process of manufacturing the IC/manufacturing a module, and thus may cause yield reduction or cost increase.

In an example, if an antenna module is designed by one front end integrated circuit (for example, the front end integrated circuit 1121), the one front end integrated circuit may be designed according to the maximum number of antenna elements included in a supporting array antenna. Accordingly, when the specification of the antenna module in which the front end integrated circuit is used is reduced, there may be elements that are not used in the front end integrated circuit and are wasted.

Referring to FIG. 11B, a PCB 1160 included in the antenna module 1100*b* according to an embodiment may have a first surface 1140 and a second surface 1150, and one front end integrated circuit (for example, the front end integrated circuit 1121 of FIG. 11A) may be divided into two front end integrated circuits 1151, 1153 and may be disposed on the second surface 1150. In this case, an aspect ratio of the two front end integrated circuits 1151, 1153 may be 1.44. Even if the vertical width (Y-Dim) of the antenna module 1100*b* is further reduced, the aspect ratio may be maintained within 3. In an example, a circuit in the PCB 116 may be designed to exchange IF, CLK, or LO between the two separated front end integrated circuits 1151, 1153, and accordingly, when a wireless communication circuit (for example, an IFIC) maintains an interface with one front end integrated circuit of the two separated front end integrated circuits 1151, 1153, the wireless communication circuit may be connected with any front end integrated circuit through circuit connection and operation. For example, even when the antenna module 1100*b* including the two separated front end integrated circuits 1151, 1153 is implemented, the number of connector pins in an antenna module (for example, the antenna module 1100*a* of FIG. 11A) implemented by a single front end integrated circuit (for example, the front end integrated circuit 1121 of FIG. 11A) may be maintained.

According to an embodiment, when a phase shifter (for example, the phase shifter 525 of FIG. 5) is positioned on a path through which an interface signal is forwarded between the two separated front end integrated circuits 1151, 1153, the number of bits of the phase shifter implemented according to each antenna element may be reduced. For example, when the number of bits of the phase shifter is reduced by one bit, the size of the phase shifter may be reduced. Since the phase shifter is a bulky element which is applied according to each antenna element, reduction in the size of the corresponding element may result in reduction in the size of the front end integrated circuit.

Figure 14:
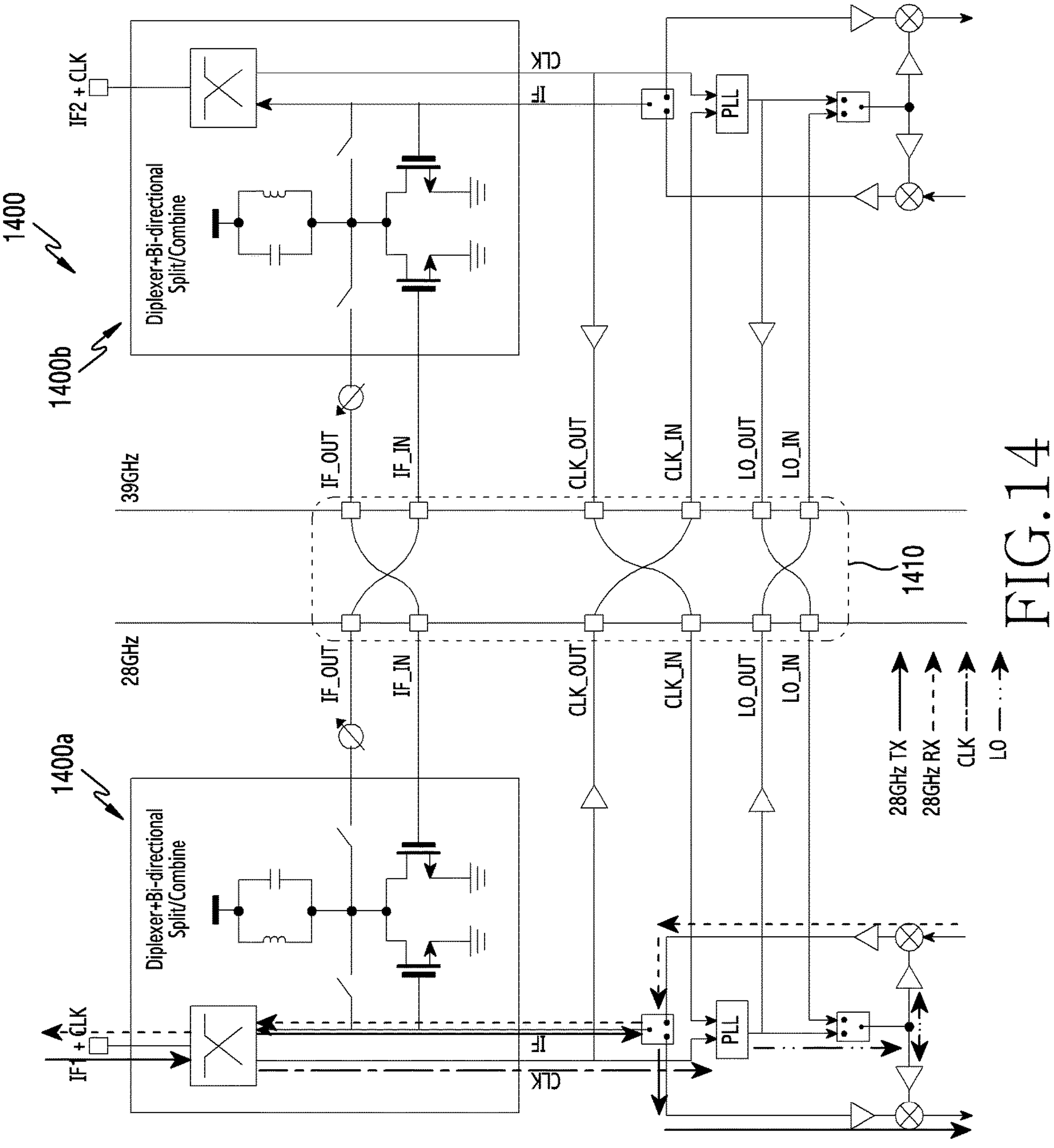
FIG. 14 is a diagram illustrating an example of transmission and reception operations in an electronic device which supports a dual band using two separated front end integrated circuits according to various embodiments.

FIG. 14 is a diagram illustrating an example of transmission and reception operations in an electronic device (for example, the electronic device 101 of FIG. 1) which supports a dual band using a front end integrated circuit 1400 according to various embodiments.

Referring to FIG. 14, according to an embodiment, the electronic device 101 which supports a plurality of frequency bands (for example, a band of about 28 GHz and a band of about 39 GHz) using two front end integrated circuits 1400*a*, 1400*b*, which are electrically coupled through an off-chip interface 1410, may support transmission and reception operations using a first frequency band (for example, 28 GHz). The first front end integrated circuit 1400*a* of the two front end integrated circuits 1400*a*, 1400*b* may support, for example, the first frequency band (for example, a band of about 28 GHz), and the second front end integrated circuit 1400*b* of the two front end integrated circuits 1400*a*, 1400*b* may support, for example, a second frequency band (for example, a band of about 39 GHz).

During a transmission operation according to an embodiment, the first front end integrated circuit 1400*a* of the two front end integrated circuits 1400*a*, 1400*b* that supports the first frequency band (for example, a band of about 28 GHz) may separate a first transmission intermediate frequency signal and a first reference clock from a signal input from a wireless communication circuit (for example, an IFIC). The first front end integrated circuit 1400*a* may generate a first local oscillation frequency signal by the separated first reference clock. The first front end integrated circuit 1400*a* may up-convert the first transmission intermediate frequency signal into a radio frequency signal using the generated first local oscillation frequency signal, and then may transmit the radio frequency signal.

During a reception operation according to an embodiment, the first front end integrated circuit 1400*a* of the two front end integrated circuits 1400*a*, 1400*b* that supports the first frequency band (for example, a band of about 28 GHz) may generate the first local oscillation frequency signal by the first reference clock. The first front end integrated circuit 1400*a* may down-convert the received radio frequency signal into a first reception intermediate frequency signal using the first local oscillation frequency signal, and then may transmit the first reception intermediate frequency signal to the wireless communication circuit (for example, the IFIC).

In the above-described embodiment, the second front end integrated circuit 1400*b* of the two front end integrated circuits 1400*a*, 1400*b* that supports the second frequency band (for example, 39 GHz) may not involve the transmission and reception operations.

Figure 15:
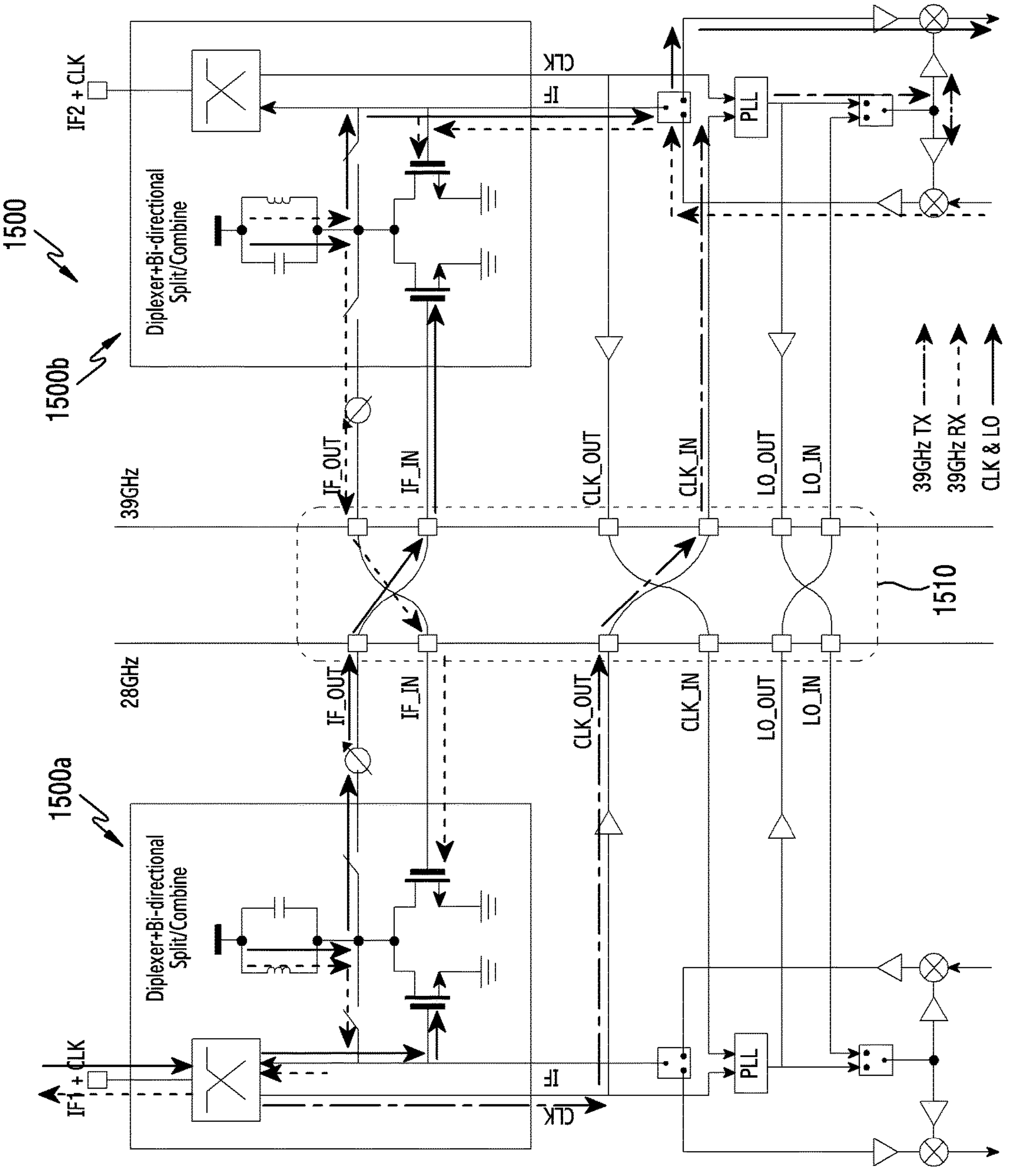
FIG. 15 is a diagram illustrating an example of transmission and reception operations in an electronic device which supports a dual band using two separated front end integrated circuits according to various embodiments.

FIG. 15 is a diagram illustrating an example of transmission and reception operations in an electronic device (for example, the electronic device 101 of FIG. 1) which supports a dual band using a front end integrated circuit 1500 according to various embodiments.

Referring to FIG. 15, according to an embodiment, the electronic device 101 which supports a plurality of frequency bands (for example, a band of about 28 GHz and a band of about 39 GHz) using two front end integrated circuits 1500*a*, 1500*b*, which are electrically coupled through an off-chip interface 1510, may support transmission and reception operations using a second frequency band (for example, a band of about 39 GHz). The first front end integrated circuit 1500*a* of the two front end integrated circuits 1500*a*, 1500*b* may support, for example, a first frequency band (for example, a band of about 28 GHz), and the second front end integrated circuit 1500*b* of the two front end integrated circuits 1500*a*, 1500*b* may support, for example, the second frequency band (for example, a band of about 39 GHz).

During a transmission operation according to an embodiment, the first front end integrated circuit 1500*a* of the two front end integrated circuits 1500*a*, 1500*b* may separate a first transmission intermediate frequency signal and a first reference clock from a signal input from a wireless communication circuit (for example, an IFIC). The first front end integrated circuit 1400*a* may forward the first transmission intermediate frequency signal and the first reference clock which are separated to the second front end integrated circuit 1500*b* through the off-chip interface 1510. The second front end integrated circuit 1500*b* may generate a second local oscillation frequency signal by the first reference clock transmitted through the off-chip interface 1510. The second front end integrated circuit 1500*b* may up-convert the forwarded first transmission intermediate frequency signal into a radio frequency signal using the generated second local oscillation frequency signal, and then may transmit the radio frequency signal.

During a reception operation according to an embodiment, the second front end integrated circuit 1500*b* of the two front end integrated circuits 1500*a*, 1500*b* may generate the second local oscillation frequency signal by the first reference clock which is provided from the first front end integrated circuit 1500*a* through the off-chip interface 1510. The second front end integrated circuit 1500*b* may down-convert the received radio frequency signal into a second reception intermediate frequency signal using the second local oscillation frequency signal, and then may transmit the second reception intermediate frequency signal to the first front end integrated circuit 1500*a* through the off-chip interface 1510. The first front end integrated circuit 1500*a* may forward the second reception intermediate frequency signal transmitted through the off-chip interface 1510 to the wireless communication circuit (for example, the IFIC).

Figure 16:
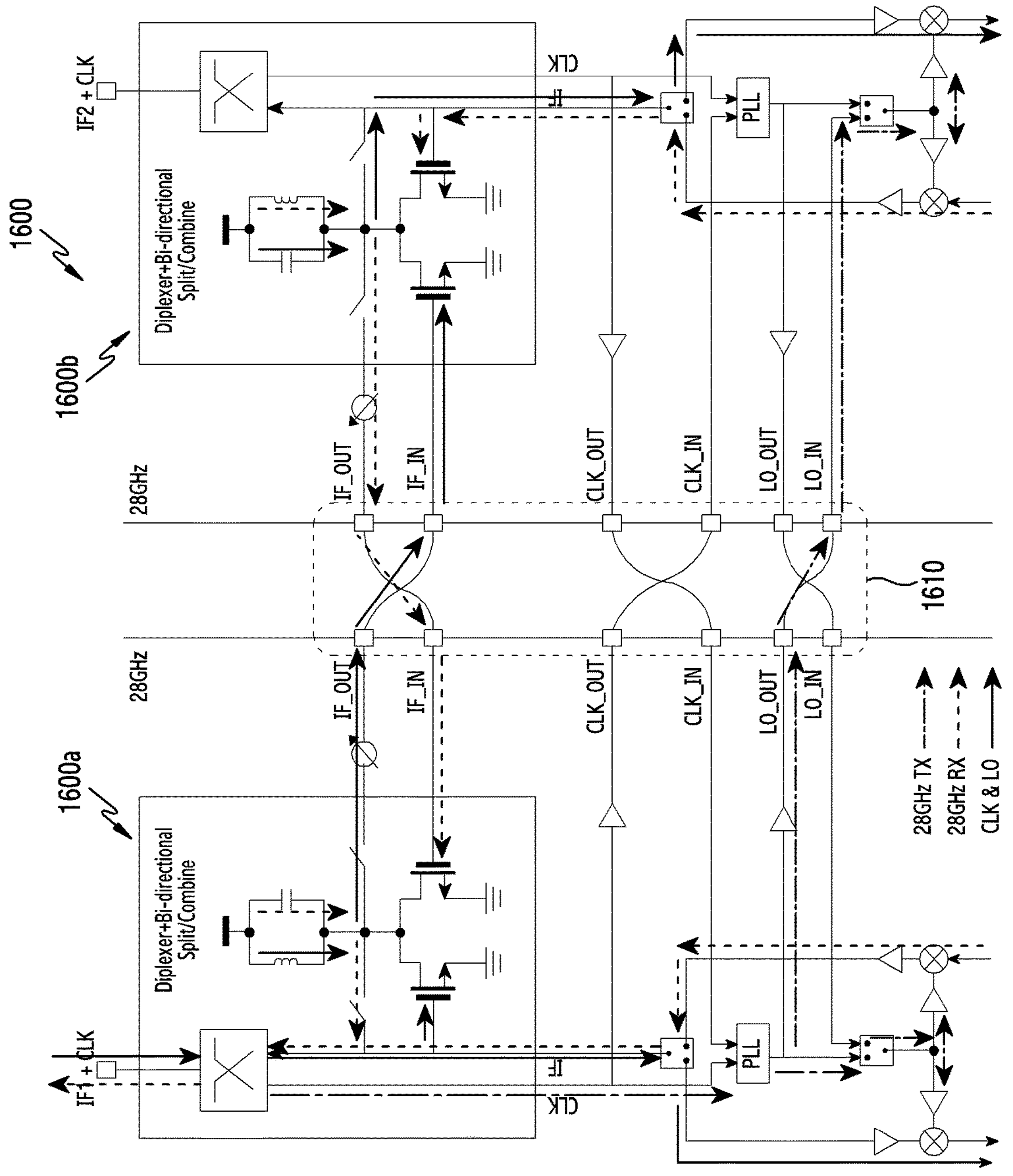
FIG. 16 is a diagram illustrating an example of transmission and reception operations in an electronic device which supports a single band using two separated front end integrated circuits according to various embodiments.

FIG. 16 is a diagram illustrating an example of transmission and reception operations in an electronic device (for example, the electronic device 101 of FIG. 1) which supports a single band using a front end integrated circuit 1600 according to various embodiments.

Referring to FIG. 16, according to an embodiment, the electronic device 101 which supports a first frequency band (for example, a band of about 28 GHz) using two front end integrated circuits 1600*a*, 1600*b*, which are electrically coupled through an off-chip interface 1610, may support transmission and reception operations using the first frequency band (for example, a band of about 28 GHz). A first front end integrated circuit 1600*a* and a second front end integrated circuit 1600*b* corresponding to the two front end integrated circuits 1600*a*, 1600*b* may support, for example, the first frequency band (for example, a band of about 28 GHz).

During a transmission operation according to an embodiment, the first front end integrated circuit 1600*a* of the two front end integrated circuits 1600*a*, 1600*b* may separate a first transmission intermediate frequency signal and a first reference clock from a signal input from a wireless communication circuit (for example, an IFIC). The first front end integrated circuit 1600*a* may generate a first local oscillation frequency signal by the separated first reference clock. The first front end integrated circuit 1600*a* may perform an operation of up-converting the first transmission intermediate frequency signal into a radio frequency signal using the generated first local oscillation frequency signal and then transmitting the radio frequency signal.

During a transmission operation according to an embodiment, the first front end integrated circuit 1600*a* may forward the first transmission intermediate frequency signal and the first local oscillation frequency signal to the second front end integrated circuit 1600*b* through the off-chip interface 1610. The second front end integrated circuit 1600*b* may receive the first transmission intermediate frequency signal and the first local oscillation frequency signal through the off-chip interface 1610. The second front end integrated circuit 1600*b* may up-convert the first transmission intermediate frequency signal into a radio frequency signal using the first local oscillation frequency signal, and then may transmit the radio frequency signal.

During a reception operation according to an embodiment, the first front end integrated circuit 1600*a* of the two front end integrated circuits 1600*a*, 1600*b* may receive the radio frequency signal and may generate the first local oscillation frequency signal by the first reference clock. The first front end integrated circuit 1600*a* may down-convert the received radio frequency signal into a first reception intermediate frequency signal using the first local oscillation frequency signal.

During a reception operation according to an embodiment, the second front end integrated circuit 1600*b* of the two front end integrated circuits 1600*a*, 1600*b* may down-convert the received radio frequency signal into a second reception intermediate frequency signal using the first local oscillation frequency signal, which is provided from the first front end integrated circuit 1600*a* through the off-chip interface 1610. The second front end integrated circuit 1600*b* may forward the second reception intermediate frequency signal to the first front end integrated circuit 1600*a* through the off-chip interface 1610.

During a reception operation according to an embodiment, the first front end integrated circuit 1600*a* may combine the first reception intermediate frequency signal and the second reception intermediate frequency signal which is provided by the second front end integrated circuit 1600*b*, and may forward the combined signal to the wireless communication circuit (for example, the IFIC).

According to an example embodiment, an electronic device (for example, the electronic device 101 of FIG. 1) may include: a housing; at least one antenna module (for example, the first, second, or third antenna module 242, 244, 246 of FIG. 2) comprising at least one antenna disposed in the housing; and a wireless communication circuit (for example, the wireless communication circuit 192 of FIG. 2) electrically connected with the at least one antenna module, wherein the at least one antenna module may include: a printed circuit board (for example, the PCB 330 of FIG. 3) including a first surface (for example, the first surface 310 of FIG. 3) and a second surface (for example, the second surface 320 of FIG. 3) facing an opposite direction of the first surface; at least one antenna element (for example, the antenna elements 311, 313, 315, 317 of FIG. 3) disposed in the printed circuit board closer to the first surface than to the second surface; and a first front end integrated circuit (for example, the first front end integration circuit 321 of FIG. 3) disposed on the second surface and electrically connected with at least one of the at least one antenna element, and the first front end integrated circuit may include at least one port for electrically connecting a second front end integrated circuit (for example, the second front end integrated circuit 232 of FIG. 3) disposed on the second surface, and the at least one port may include a first port (for example, the second port 412 of FIG. 4) configured to output a first intermediate frequency signal to the second front end integrated circuit or to receive a second intermediate frequency signal from the second front end integrated circuit.

According to an example embodiment, the at least one port may further include a second port (for example, the third port 413 of FIG. 4) configured to output a first reference clock to the second front end integrated circuit or to receive a second reference clock from the second front end integrated circuit.

According to an example embodiment, the first front end integrated circuit may further include: a third port (for example, the fourth port 414 of FIG. 4) configured to receive a first signal in which a transmission intermediate frequency signal and the reference clock are combined from an intermediate frequency integrated circuit, or to output a reception intermediate frequency signal to the intermediate frequency integrated circuit; and at least one antenna port (for example, the first to eighth ports 411, 412, 413, 414, 415, 416, 417, 418 of FIG. 4) configured to output a radio frequency signal to the at least one antenna element or to receive a radio frequency signal from the at least one antenna element.

According to an example embodiment, the first front end integrated circuit may include: a signal manager (for example, the signal manager 421 of FIG. 4) comprising circuitry configured to output one of the first reference clock separated from the first signal input to the third port or the second reference clock input to the second port, and to output one of the first intermediate frequency signal separated from the first signal input to the third port or the second intermediate frequency signal input to the first port; and a local oscillation frequency generator (for example, the local oscillation frequency generator 422 of FIG. 4) comprising circuitry configured to generate a first local oscillation frequency signal by one of the first reference clock output by the signal manager or the second reference clock input to the second port.

According to an example embodiment, the signal manager may include a switching circuit (for example, the plurality of switches 429, 443, 449, 453, 459, 463, 469, 473, 479 of FIG. 4) configured to provide a forwarding path of the first intermediate frequency signal or the second intermediate frequency signal, based on at least one of a transmission operation, a reception operation, or an activation frequency band.

According to an example embodiment, the first front end integrated circuit may further include: a first mixer (for example, the first mixer 424 of FIG. 4) configured to up-convert the first intermediate frequency signal output by the signal manager into a radio frequency signal using the first local oscillation frequency signal provided from the local oscillation frequency generator; and a second mixer (for example, the second mixer 427 of FIG. 4) configured to down-convert a radio frequency signal received by the at least one antenna element into an intermediate frequency signal using the first local oscillation frequency signal provided from the local oscillation frequency generator, and to provide the intermediate frequency signal to the signal manager.

According to an example embodiment, the printed circuit board may include a via configured to electrically couple the at least one antenna port and the at least one antenna element.

According to an example embodiment, the at least one port may further include a fourth port (for example, the fifth port 414 of FIG. 4) configured to output a first local oscillation frequency signal generated at the first front end integrated circuit to the second front end integrated circuit, or to receive a second local oscillation frequency signal generated by the second front end integrated circuit.

According to an example embodiment, the first front end integrated circuit may further include: a first mixer (for example, the first mixer 424 of FIG. 4) configured to up-convert the first intermediate frequency signal into a transmission radio frequency signal using the second local oscillation frequency signal input to the fourth port; and a second mixer (for example, the second mixer 427 of FIG. 4) configured to down-convert a reception radio frequency signal received by the at least one antenna element into a reception intermediate frequency signal using the second local oscillation frequency signal input to the fourth port.

According to an example embodiment, the first front end integrated circuit may further include: a splitter-combiner (for example, the splitter-combiners 431, 433, 435 of FIG. 4) comprising circuitry configured to distribute the transmission radio frequency signal up-converted by the first mixer to a plurality of power amplifiers (for example, the power amplifiers 447, 457, 467, 477 of FIG. 4), to combine reception radio frequency signals amplified by a plurality of low noise amplifiers (for example, the low noise amplifiers 445, 455, 465, 475 of FIG. 4) and to output the combined signal to the second mixer.

According to an example embodiment, the plurality of power amplifiers may be configured to electrically connect the splitter-combiner and the at least one antenna element to amplify the transmission radio frequency signals output from the splitter-combiner and to transmit to the at least one antenna element, wherein the plurality of low noise amplifiers may be configured to electrically connect the at least one antenna element and the splitter-combiner to amplify the reception radio frequency signals output from the at least one antenna element and then to transmit to the splitter-combiner.

According to an example embodiment, the first front end integrated circuit may further include: a phase shifter (for example, the phase shifter 525 of FIG. 5) comprising circuitry configured to perform phase shifting with respect to the first intermediate frequency signal and to transmit the first intermediate frequency signal to the first port.

According to an example embodiment, the first front end integrated circuit may further include a phase shifter comprising circuitry configured to perform phase shifting with respect to the second intermediate frequency signal input to the first port.

According to an example embodiment, a radio frequency band processed by the first front end integrated circuit may be a same radio frequency band as a radio frequency band processed by the second front end integrated circuit.

According to an example embodiment, a radio frequency band processed by the first front end integrated circuit and a radio frequency band processed by the second front end integrated circuit may be 28 GHz.

According to an embodiment, a radio frequency band processed by the first front end integrated circuit may be a different radio frequency band than a radio frequency band processed by the second front end integrated circuit.

According to an example embodiment, a radio frequency band processed by the first front end integrated circuit may be 28 GHz, and a radio frequency band processed by the second front end integrated circuit may be 39 GHz.

According to an example embodiment, the printed circuit board may include a wire configured to electrically connect one antenna element to a first antenna port provided in the first front end integrated circuit, and a second antenna port provided in the second front end integrated circuit.

According to an example embodiment, an aspect ratio of the first front end integrated circuit may be less than 3.

According to an example embodiment, an intermediate frequency integrated circuit (IFIC) may be electrically connected to the first front end integrated circuit of the first front end integrated circuit and the second front end integrated circuit.

According to an example embodiment, an electronic device (for example, the electronic device 101 of FIG. 1) may include a first area where a plurality of antenna elements are positioned on a first surface, a second area where a plurality of front end integrated circuits are independently positioned on a second surface opposite the first surface, and a printed circuit board including a wire configured to electrically couple ports of a plurality of ports provided in a first front end integrated circuit to ports of a plurality of ports provided in a second front end integrated circuit based on the first front end integrated circuit and the second front end integrated circuit being positioned in the second area. The ports provided in the first front end integrated circuit may include a first port configured to output a first intermediate frequency signal to be processed by the first front end integrated circuit, and a second port configured to input a second intermediate frequency signal output from the second front end integrated circuit.

According to various embodiments of the disclosure, an aspect ratio of a front end integrated circuit included in an electronic device can be reduced. In addition, the number of elements that are not used in an antenna module in an electronic device, and the number of bits of a phase shifter applied according to each front end integrated circuit can be reduced.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:

a housing;

at least one antenna module comprising at least one antenna disposed in the housing; and a wireless communication circuit electrically connected with the at least one antenna module, wherein the at least one antenna module comprises:

a printed circuit board comprising a first surface and a second surface, the second surface facing a direction opposite a direction of the first surface;

at least one antenna element disposed in the printed circuit board and closer to the first surface than to the second surface; and a first front end integrated circuit disposed on the second surface and electrically connected with at least one of the at least one antenna element, wherein the first front end integrated circuit comprises at least one port configured to electrically connect a second front end integrated circuit disposed on the second surface, and the at least one port comprises a first port configured to output a first intermediate frequency signal to the second front end integrated circuit and/or to receive a second intermediate frequency signal from the second front end integrated circuit.

2. The electronic device of claim 1, wherein the at least one port further comprises a second port configured to output a first reference clock to the second front end integrated circuit or to receive a second reference clock from the second front end integrated circuit.

3. The electronic device of claim 1, wherein the first front end integrated circuit further comprises:

a third port configured to receive a first signal including a transmission intermediate frequency signal and the reference clock combined from an intermediate frequency integrated circuit, or to output a reception intermediate frequency signal to the intermediate frequency integrated circuit; and at least one antenna port configured to output a radio frequency signal to the at least one antenna element or to receive a radio frequency signal from the at least one antenna element.

4. The electronic device of claim 3, wherein the first front end integrated circuit comprises:

a signal manager comprising circuitry configured to output one of the first reference clock separated from the first signal input to the third port or the second reference clock input to the second port, and to output one of the first intermediate frequency signal separated from the first signal input to the third port or the second intermediate frequency signal input to the first port; and a local oscillation frequency generator comprising circuitry configured to generate a first local oscillation frequency signal by one of the first reference clock output by the signal manager or the second reference clock input to the second port.

5. The electronic device of claim 4, wherein the signal manager comprises a switching circuit configured to provide a forwarding path of the first intermediate frequency signal or the second intermediate frequency signal, based on at least one of a transmission operation, a reception operation, or an activation frequency band.

6. The electronic device of claim 4, wherein the first front end integrated circuit further comprises:

a first mixer configured to up-convert the first intermediate frequency signal output by the signal manager into a radio frequency signal using the first local oscillation frequency signal provided from the local oscillation frequency generator; and a second mixer configured to down-convert a radio frequency signal received by the at least one antenna element into an intermediate frequency signal using the first local oscillation frequency signal provided from the local oscillation frequency generator, and to provide the intermediate frequency signal to the signal manager.

7. The electronic device of claim 3, wherein the printed circuit board comprises a via configured to electrically couple the at least one antenna port and the at least one antenna element.

8. The electronic device of claim 1, wherein the at least one port further comprises a fourth port configured to output a first local oscillation frequency signal generated at the first front end integrated circuit to the second front end integrated circuit, or to receive a second local oscillation frequency signal generated by the second front end integrated circuit.

9. The electronic device of claim 8, wherein the first front end integrated circuit further comprises:

a first mixer configured to up-convert the first intermediate frequency signal into a transmission radio frequency signal using the second local oscillation frequency signal input to the fourth port; and a second mixer configured to down-convert a reception radio frequency signal received by the at least one antenna element into a reception intermediate frequency signal using the second local oscillation frequency signal input to the fourth port.

10. The electronic device of claim 9, wherein the first front end integrated circuit further comprises a splitter-combiner comprising circuitry configured to distribute the transmission radio frequency signal up-converted by the first mixer to a plurality of power amplifiers, and to combine reception radio frequency signals amplified by a plurality of low noise amplifiers and to output the combined signal to the second mixer.

11. The electronic device of claim 10, wherein the plurality of power amplifiers are configured to electrically connect the splitter-combiner and the at least one antenna element to amplify the transmission radio frequency signals output from the splitter-combiner and to transmit the amplified transmission radio frequency signals to the at least one antenna element, and wherein the plurality of low noise amplifiers are configured to electrically connect the at least one antenna element and the splitter-combiner to amplify the reception radio frequency signals output from the at least one antenna element and to transmit the amplified reception radio frequency signals to the splitter-combiner.

12. The electronic device of claim 1, wherein the first front end integrated circuit further comprises a phase shifter comprising circuitry configured to perform phase shifting with respect to the first intermediate frequency signal and to transmit the first intermediate frequency signal to the first port.

13. The electronic device of claim 1, wherein the first front end integrated circuit further comprises a phase shifter comprising circuitry configured to perform phase shifting with respect to the second intermediate frequency signal input to the first port.

14. The electronic device of claim 1, wherein a radio frequency band processed by the first front end integrated circuit is a same radio frequency band as a radio frequency band processed by the second front end integrated circuit.

15. The electronic device of claim 1, wherein a radio frequency band processed by the first front end integrated circuit and a radio frequency band processed by the second front end integrated circuit are 28 GHz.

16. The electronic device of claim 1, wherein a radio frequency band processed by the first front end integrated circuit is a different radio frequency band than a radio frequency band processed by the second front end integrated circuit.

17. The electronic device of claim 1, wherein a radio frequency band processed by the first front end integrated circuit is 28 GHz, and a radio frequency band processed by the second front end integrated circuit is 39 GHz.

18. The electronic device of claim 1, wherein the printed circuit board includes a wire configured to electrically connect one antenna element to a first antenna port, the first antenna port being one of at least one antenna port provided in the first front end integrated circuit, and a second antenna port, the second antenna port being one of at least one antenna port provided in the second front end integrated circuit.

19. The electronic device of claim 1, wherein an aspect ratio of the first front end integrated circuit is less than 3.

20. The electronic device of claim 1, wherein an intermediate frequency integrated circuit (IFIC) is electrically connected to the first front end integrated circuit of the first front end integrated circuit and the second front end integrated circuit.

* * * * *